US007006805B1

(12) United States Patent
Sorrells et al.

(10) Patent No.: US 7,006,805 B1
(45) Date of Patent: Feb. 28, 2006

(54) ALIASING COMMUNICATION SYSTEM WITH MULTI-MODE AND MULTI-BAND FUNCTIONALITY AND EMBODIMENTS THEREOF, SUCH AS THE FAMILY RADIO SERVICE

(75) Inventors: David F. Sorrells, Jacksonville, FL (US); Michael J. Bultman, Jacksonville, FL (US); Charles D. Clements, Jacksonville, FL (US); Robert W. Cook, Switzerland, FL (US); Joseph M. Hamilla, St. Augustine, FL (US); Richard C. Looke, Jacksonville, FL (US); Charley D. Moses, Jr., Jacksonville, FL (US); Gregory S. Silver, St. Augustine, FL (US)

(73) Assignee: Parker Vision, Inc., Jacksonville, FL (US)

( * ) Notice: Subject to any disclaimer, the term of this patent is extended or adjusted under 35 U.S.C. 154(b) by 0 days.

(21) Appl. No.: 09/476,093

(22) Filed: Jan. 3, 2000

Related U.S. Application Data

(60) Provisional application No. 60/116,847, filed on Jan. 22, 1999.

(51) Int. Cl.
*H04B 1/18* (2006.01)

(52) U.S. Cl. ............................... 455/188.1; 455/180.1; 455/266; 375/340; 375/349

(58) Field of Classification Search ................ 375/259, 375/316, 138, 139, 200, 260, 208, 344, 202, 375/346, 373, 376, 340, 229, 325, 324, 349; 364/138, 139; 455/188.1, 180.1, 339, 340, 455/313, 168.1, 189.1, 191.3, 285, 302, 207, 455/208, 260, 316, 550, 575, 264, 265, 266, 455/188.2, 550.1, 575.1, 318, 216, 257, 323, 455/324, 190.1, 161.1, 455, 516, 62, 214, 455/71, 215, 196.1, 151.1, 166.2; 329/315, 329/318

See application file for complete search history.

(56) References Cited

U.S. PATENT DOCUMENTS

| | | | | |
|---|---|---|---|---|
| 2,057,613 A | 10/1936 | Gardner | ......................... | 250/8 |
| 2,241,078 A | 5/1941 | Vreeland | ..................... | 179/15 |
| 2,270,385 A | 1/1942 | Skillman | ..................... | 179/15 |

(Continued)

FOREIGN PATENT DOCUMENTS

DE 35 41 031 A1 5/1986

(Continued)

OTHER PUBLICATIONS

Aghvami, H. et al., "Land Mobile Satellites Using the Highly Elliptic Orbits- The UK T-SAT Mobile Payload," *Fourth International Conference on Satellite Systems for Mobile Communications and Navigation*, IEE, pp. 147-153 (Oct. 17-19, 1988).

(Continued)

*Primary Examiner*—Edward F. Urban
*Assistant Examiner*—Charles Chow
(74) *Attorney, Agent, or Firm*—Sterne, Kessler, Goldstein & Fox P.L.L.C.

(57) ABSTRACT

A receiver having multi-mode and multi-band functionality and capabilities is described herein. The receiver is capable of selectively operating over a plurality of bands and channels. The receiver operates in a plurality of modes, including but not limited to a single band/channel mode, and a multiple band/channel mode. The receiver may form a portion of a transceiver. The transceiver may also include a transmitter. In an embodiment, the transceiver is a family radio service (FRS) unit, although the invention is not limited to this embodiment.

16 Claims, 10 Drawing Sheets

U.S. PATENT DOCUMENTS 2,283,575 A 5/1942 Roberts ......... 250/6
2,358,152 A 9/1944 Earp ......... 179/171.5
2,410,350 A 10/1946 Labin et al. ......... 179/15
2,451,430 A 10/1948 Barone ......... 250/8
2,462,069 A 2/1949 Chatterjea et al. ......... 250/17
2,462,181 A 2/1949 Grosselfinger ......... 250/17
2,472,798 A 6/1949 Fredendall ......... 178/44
2,497,859 A 2/1950 Boughtwood et al. ......... 250/8
2,499,279 A 2/1950 Peterson ......... 332/41
2,802,208 A 8/1957 Hobbs ......... 343/176
2,985,875 A 5/1961 Grisdale et al. ......... 343/100
3,023,309 A 2/1962 Foulkes ......... 250/17
3,069,679 A 12/1962 Sweeney et al. ......... 343/200
3,104,393 A 9/1963 Vogelman ......... 343/200
3,114,106 A 12/1963 McManus ......... 325/56
3,118,117 A 1/1964 King et al. ......... 332/22
3,226,643 A 12/1965 McNair ......... 325/40
3,246,084 A 4/1966 Kryter
3,258,694 A 6/1966 Shepherd ......... 325/145
3,383,598 A 5/1968 Sanders ......... 325/163
3,384,822 A 5/1968 Miyagi ......... 325/30
3,454,718 A 7/1969 Perreault ......... 178/66
3,523,291 A 8/1970 Pierret ......... 340/347
3,548,342 A 12/1970 Maxey ......... 332/9
3,555,428 A 1/1971 Perreault ......... 325/320
3,614,627 A * 10/1971 Runyan ......... 325/345
3,614,630 A 10/1971 Rorden
3,617,892 A 11/1971 Hawley et al. ......... 325/145
3,621,402 A 11/1971 Gardner ......... 328/37
3,623,160 A 11/1971 Giles et al. ......... 340/347 DA
3,626,417 A 12/1971 Gilbert ......... 343/203
3,629,696 A 12/1971 Bartelink ......... 324/57 R
3,662,268 A 5/1972 Gans et al. ......... 325/56
3,689,841 A 9/1972 Bello et al. ......... 325/39
3,702,440 A 11/1972 Moore
3,714,577 A 1/1973 Hayes ......... 325/145
3,716,730 A 2/1973 Cerny, Jr. ......... 307/295
3,717,844 A 2/1973 Barret et al. ......... 340/5 R
3,735,048 A 5/1973 Tomsa et al. ......... 179/15 BM
3,736,513 A 5/1973 Wilson
3,767,984 A 10/1973 Shinoda et al.
3,806,811 A 4/1974 Thompson ......... 325/146
3,852,530 A 12/1974 Shen
3,868,601 A 2/1975 MacAfee ......... 332/45
3,940,697 A * 2/1976 Morgan ......... 325/333
3,949,300 A 4/1976 Sadler ......... 325/31
3,967,202 A 6/1976 Batz ......... 325/31
3,980,945 A 9/1976 Bickford ......... 325/30
3,987,280 A 10/1976 Bauer ......... 235/150.53
3,991,277 A 11/1976 Hirata ......... 179/15 FD
4,003,002 A 1/1977 Snijders et al. ......... 332/10
4,013,966 A 3/1977 Campbell ......... 325/363
4,016,366 A * 4/1977 Kurata ......... 179/15 BT
4,017,798 A 4/1977 Gordy et al. ......... 325/42
4,019,140 A 4/1977 Swerdlow ......... 322/65
4,032,847 A 6/1977 Unkauf ......... 325/323
4,035,732 A 7/1977 Lohrmann ......... 325/446
4,045,740 A * 8/1977 Baker ......... 325/427
4,047,121 A 9/1977 Campbell ......... 331/76
4,051,475 A 9/1977 Campbell ......... 343/180
4,066,841 A 1/1978 Young ......... 178/66 R
4,066,919 A 1/1978 Huntington ......... 307/353
4,080,573 A 3/1978 Howell ......... 325/439
4,081,748 A 3/1978 Batz ......... 325/56
4,115,737 A * 9/1978 Hongu et al. ......... 325/459
4,130,765 A 12/1978 Arakelian et al. ......... 307/220 R
4,130,806 A 12/1978 Van Gerwen et al. ......... 325/487
4,132,952 A * 1/1979 Hongu et al. ......... 455/188.1
4,142,155 A 2/1979 Adachi ......... 325/47
4,170,764 A 10/1979 Salz et al. ......... 332/17
4,204,171 A 5/1980 Sutphin, Jr. ......... 328/167
4,210,872 A 7/1980 Gregorian ......... 330/9
4,220,977 A 9/1980 Yamanaka
4,245,355 A 1/1981 Pascoe et al. ......... 455/326
4,250,458 A 2/1981 Richmond et al.
4,253,066 A 2/1981 Fisher et al. ......... 329/50
4,253,067 A 2/1981 Caples et al. ......... 329/110
4,253,069 A 2/1981 Nossek ......... 330/107
4,308,614 A 12/1981 Fisher et al. ......... 370/119
4,320,361 A 3/1982 Kikkert ......... 332/16 R
4,320,536 A 3/1982 Dietrich ......... 455/325
4,334,324 A 6/1982 Hoover ......... 455/333
4,346,477 A * 8/1982 Gordy ......... 455/257
4,355,401 A 10/1982 Ikoma et al. ......... 375/5
4,356,558 A 10/1982 Owen et al. ......... 364/724
4,360,867 A 11/1982 Gonda ......... 363/158
4,363,132 A 12/1982 Collin ......... 455/52
4,365,217 A 12/1982 Berger et al. ......... 333/165
4,369,522 A 1/1983 Cerny, Jr. et al. ......... 455/333
4,370,572 A 1/1983 Cosand et al. ......... 307/353
4,384,357 A 5/1983 deBuda et al.
4,389,579 A 6/1983 Stein ......... 307/353
4,392,255 A 7/1983 Del Giudice ......... 455/328
4,393,395 A 7/1983 Hacke et al. ......... 358/23
4,430,629 A 2/1984 Betzl et al. ......... 333/165
4,441,080 A 4/1984 Saari
4,446,438 A 5/1984 Chang et al. ......... 328/127
4,456,990 A 6/1984 Fisher et al. ......... 370/119
4,470,145 A 9/1984 Williams
4,472,785 A 9/1984 Kasuga ......... 364/718
4,479,226 A 10/1984 Prabhu et al. ......... 375/1
4,481,490 A 11/1984 Huntley ......... 332/41
4,481,642 A 11/1984 Hanson ......... 375/9
4,483,017 A 11/1984 Hampel et al.
4,484,143 A 11/1984 French et al. ......... 329/50
4,485,488 A 11/1984 Houdart ......... 455/327
4,488,119 A 12/1984 Marshall
4,504,803 A 3/1985 Lee et al. ......... 332/31 R
4,510,467 A 4/1985 Chang et al.
4,517,519 A 5/1985 Mukaiyama ......... 329/126
4,517,520 A 5/1985 Ogawa ......... 329/145
4,518,935 A 5/1985 van Roermund ......... 333/173
4,521,892 A 6/1985 Vance et al. ......... 375/88
4,563,773 A 1/1986 Dixon, Jr. et al. ......... 455/327
4,577,157 A 3/1986 Reed ......... 329/50
4,583,239 A 4/1986 Vance ......... 375/94
4,591,736 A 5/1986 Hirao et al. ......... 307/267
4,602,220 A 7/1986 Kurihara ......... 331/19
4,603,300 A 7/1986 Welles, II et al. ......... 329/50
4,612,464 A 9/1986 Ishikawa et al. ......... 307/496
4,612,518 A 9/1986 Gans et al. ......... 332/21
4,616,191 A 10/1986 Galani et al. ......... 331/4
4,621,217 A 11/1986 Saxe et al. ......... 315/1
4,628,517 A 12/1986 Schwarz et al. ......... 375/40
4,633,510 A 12/1986 Suzuki et al.
4,634,998 A 1/1987 Crawford ......... 331/1 A
4,648,021 A 3/1987 Alberkrack ......... 363/157
4,651,034 A 3/1987 Sato ......... 307/556

4,653,117 A 3/1987 Heck .......................... 455/209
4,660,164 A 4/1987 Leibowitz
4,675,882 A 6/1987 Lillie et al. .................. 375/80
4,688,253 A 8/1987 Gumm .......................... 381/7
4,716,376 A 12/1987 Daudelin .................... 329/107
4,716,388 A 12/1987 Jacobs ........................ 333/173
4,718,113 A 1/1988 Rother et al. ............... 455/209
4,726,041 A 2/1988 Prohaska et al. ............. 375/91
4,733,403 A 3/1988 Simone ...................... 375/103
4,734,591 A 3/1988 Ichitsubo ................. 307/219.1
4,737,969 A 4/1988 Steel et al. ................... 375/67
4,740,675 A 4/1988 Brosnan et al.
4,743,858 A 5/1988 Everard ....................... 330/10
4,745,463 A 5/1988 Lu .............................. 358/23
4,751,468 A 6/1988 Agoston ..................... 328/133
4,757,538 A 7/1988 Zink ............................ 381/7
4,761,798 A 8/1988 Griswold, Jr. et al.
4,768,187 A 8/1988 Marshall .................... 370/69.1
4,769,612 A 9/1988 Tamakoshi et al. ......... 328/167
4,772,853 A 9/1988 Hart
4,785,463 A 11/1988 Janc et al. ..................... 375/1
4,789,837 A 12/1988 Ridgers
4,791,584 A 12/1988 Greivenkamp, Jr. ........ 364/525
4,801,823 A 1/1989 Yokoyama .................. 307/353
4,806,790 A 2/1989 Sone .......................... 307/353
4,810,904 A 3/1989 Crawford .................... 307/353
4,810,976 A 3/1989 Cowley et al. ......... 331/117 R
4,811,362 A 3/1989 Yester, Jr. et al. ............ 375/75
4,816,704 A 3/1989 Fiori, Jr. ..................... 307/519
4,819,252 A 4/1989 Christopher ................ 375/122
4,833,445 A 5/1989 Buchele ...................... 341/118
4,841,265 A 6/1989 Watanabe et al. ........... 333/194
4,855,894 A 8/1989 Asahi et al. ................ 363/157
4,857,928 A 8/1989 Gailus et al.
4,862,121 A 8/1989 Hochschild et al. ........ 333/173
4,868,654 A 9/1989 Juri et al. .................. 358/133
4,870,659 A 9/1989 Oishi et al. ................... 375/82
4,871,987 A 10/1989 Kawase ...................... 332/100
4,873,492 A 10/1989 Myer
4,885,587 A 12/1989 Wiegand et al. ............... 42/14
4,885,756 A 12/1989 Fontanes et al. .............. 375/82
4,888,557 A 12/1989 Puckette, IV et al. ...... 329/341
4,890,302 A 12/1989 Muilwijk ..................... 375/80
4,893,316 A 1/1990 Janc et al. .................... 375/44
4,893,341 A 1/1990 Gehring ......................... 381/7
4,894,766 A 1/1990 De Agro ..................... 363/159
4,896,152 A 1/1990 Tiemann ..................... 340/853
4,902,979 A 2/1990 Puckette, IV ............... 329/343
4,908,579 A 3/1990 Tawfik et al. ............... 328/167
4,910,752 A 3/1990 Yester, Jr. et al. ............ 375/75
4,914,405 A 4/1990 Wells .......................... 331/25
4,920,510 A 4/1990 Senderowicz et al. ...... 364/825
4,922,452 A 5/1990 Larsen et al. ................. 365/45
4,931,921 A 6/1990 Anderson ................... 363/163
4,943,974 A 7/1990 Motamedi ...................... 375/1
4,944,025 A 7/1990 Gehring et al. ............. 455/207
4,955,079 A 9/1990 Connerney et al. ......... 455/325
4,965,467 A 10/1990 Bilterijst ..................... 307/352
4,967,160 A 10/1990 Quievy et al. ................ 328/16
4,970,703 A 11/1990 Hariharan et al. .......... 367/138
4,972,436 A 11/1990 Halim et al.
4,982,353 A 1/1991 Jacob et al. ............. 364/724.1
4,984,077 A 1/1991 Uchida ....................... 358/140
4,995,055 A 2/1991 Weinberger et al. ........... 375/5
5,003,621 A 3/1991 Gailus ........................ 455/209
5,005,169 A 4/1991 Bronder et al. ............... 370/76
5,006,810 A 4/1991 Popescu ..................... 328/167
5,010,585 A 4/1991 Garcia ........................ 455/118
5,012,245 A 4/1991 Scott et al.
5,014,304 A 5/1991 Nicollini et al. ............ 379/399
5,015,963 A 5/1991 Sutton ........................ 329/361
5,016,242 A 5/1991 Tang
5,017,924 A 5/1991 Guiberteau et al. ......... 342/195
5,020,149 A 5/1991 Hemmie ..................... 455/325
5,020,154 A 5/1991 Zierhut ....................... 455/608
5,052,050 A 9/1991 Collier et al. ............... 455/296
5,058,107 A 10/1991 Stone et al.
5,065,409 A 11/1991 Hughes et al. ................ 375/91
5,083,050 A 1/1992 Vasile ........................ 307/529
5,091,921 A 2/1992 Minami ....................... 375/88
5,095,533 A 3/1992 Loper et al. ................ 455/245
5,095,536 A 3/1992 Loper ......................... 455/324
5,111,152 A 5/1992 Makino ...................... 329/300
5,113,094 A 5/1992 Grace et al. ................ 307/529
5,113,129 A 5/1992 Hughes ...................... 323/316
5,115,409 A 5/1992 Stepp ......................... 364/841
5,122,765 A 6/1992 Pataut ........................ 332/105
5,124,592 A 6/1992 Hagino ....................... 307/520
5,126,682 A 6/1992 Weinberg et al. ........... 329/304
5,136,267 A 8/1992 Cabot ......................... 333/174
5,140,705 A 8/1992 Kosuga ...................... 455/318
5,150,124 A 9/1992 Moore et al. ................. 342/68
5,151,661 A 9/1992 Caldwell et al. .............. 328/14
5,157,687 A 10/1992 Tymes ........................... 375/1
5,159,710 A 10/1992 Cusdin ....................... 455/304
5,170,414 A 12/1992 Silvian ........................ 375/59
5,172,070 A 12/1992 Hiraiwa et al. ............. 329/304
5,179,731 A 1/1993 Tränkle et al.
5,191,459 A 3/1993 Thompson et al. ......... 359/133
5,204,642 A 4/1993 Ashgar et al. .............. 331/135
5,212,827 A 5/1993 Meszko et al. ............. 455/219
5,214,787 A 5/1993 Karkota, Jr. ................. 455/3.2
5,218,562 A 6/1993 Basehore et al.
5,220,583 A 6/1993 Solomon ..................... 375/82
5,220,680 A 6/1993 Lee ............................ 455/102
5,222,144 A 6/1993 Whikehart ................... 381/15
5,230,097 A 7/1993 Currie et al. ............ 455/226.1
5,239,496 A 8/1993 Vancraeynest
5,239,686 A 8/1993 Downey ...................... 455/78
5,241,561 A 8/1993 Barnard ......................... 375/1
5,249,203 A 9/1993 Loper .......................... 375/97
5,251,218 A 10/1993 Stone et al. ................ 370/120
5,251,232 A 10/1993 Nonami ......................... 375/5
5,260,970 A 11/1993 Henry et al. .................. 375/10
5,260,973 A 11/1993 Watanabe
5,263,194 A 11/1993 Ragan ........................ 455/316
5,263,196 A 11/1993 Jasper ........................ 455/324
5,267,023 A 11/1993 Kawasaki .................... 358/23
5,278,826 A 1/1994 Murphy et al. ............... 370/76
5,282,023 A 1/1994 Scarpa ........................ 358/36
5,282,222 A 1/1994 Fattouche et al.
5,287,516 A 2/1994 Schaub ........................ 375/88
5,293,398 A 3/1994 Hamao et al. ................. 375/1
5,303,417 A 4/1994 Laws ......................... 455/314
5,307,517 A 4/1994 Rich .......................... 455/306
5,315,583 A 5/1994 Murphy et al. ............... 370/18
5,319,799 A 6/1994 Morita ........................ 455/78
5,321,852 A 6/1994 Seong ..................... 455/182.1
5,325,204 A 6/1994 Scarpa ....................... 348/607
5,337,014 A 8/1994 Najle et al. ................. 324/613
5,339,054 A 8/1994 Taguchi ...................... 332/100
5,339,459 A 8/1994 Schiltz et al. ............... 455/333
5,345,239 A 9/1994 Madni et al.
5,353,306 A 10/1994 Yamamoto ................... 375/14
5,355,114 A 10/1994 Sutterlin et al. ........ 340/310 A
5,361,408 A 11/1994 Watanabe et al. ........... 455/324
5,369,404 A 11/1994 Galton ....................... 341/143
5,369,789 A 11/1994 Kosugi et al.
5,369,800 A 11/1994 Takagi et al. ................. 455/59
5,375,146 A 12/1994 Chalmers .................... 375/103
5,379,040 A 1/1995 Mizomoto et al. .......... 341/143
5,379,141 A 1/1995 Thompson et al. ......... 359/125
5,388,063 A 2/1995 Takatori et al. ........ 364/724.17
5,389,839 A 2/1995 Heck
5,390,364 A 2/1995 Webster et al. ............ 455/52.3
5,400,084 A 3/1995 Scarpa ....................... 348/624

5,404,127 A 4/1995 Lee et al. .............. 340/310.02
5,410,270 A 4/1995 Rybicki et al.
5,410,541 A 4/1995 Hotto .......................... 370/76
5,410,743 A 4/1995 Seely et al. ................. 455/326
5,412,352 A 5/1995 Graham ...................... 332/103
5,416,449 A 5/1995 Joshi
5,416,803 A 5/1995 Janer .......................... 375/324
5,422,909 A 6/1995 Love et al.
5,422,913 A 6/1995 Wilkinson .................. 375/347
5,423,082 A 6/1995 Cygan et al. ............... 455/126
5,428,638 A 6/1995 Cioffi et al. ................ 375/224
5,428,640 A 6/1995 Townley ..................... 375/257
5,434,546 A 7/1995 Palmer ....................... 332/151
5,438,329 A 8/1995 Gastouniotis et al.
5,438,692 A 8/1995 Mohindra ................... 455/324
5,440,311 A 8/1995 Gallagher et al.
5,444,415 A 8/1995 Dent et al. ................. 329/302
5,444,416 A 8/1995 Ishikawa et al. ............ 329/341
5,444,865 A 8/1995 Heck et al. ................... 455/86
5,446,421 A 8/1995 Kechkaylo .................. 332/100
5,446,422 A 8/1995 Mattila et al. .............. 332/103
5,448,602 A 9/1995 Ohmori et al. ............. 375/347
5,451,899 A 9/1995 Lawton ...................... 329/302
5,454,007 A 9/1995 Dutta ......................... 375/322
5,454,009 A 9/1995 Fruit et al. .................. 372/202
5,463,356 A 10/1995 Palmer ....................... 332/117
5,463,357 A 10/1995 Hobden ...................... 332/151
5,465,071 A 11/1995 Kobayashi et al. ......... 329/315
5,465,410 A 11/1995 Hiben et al. ................ 455/266
5,465,415 A 11/1995 Bien ......................... 455/326
5,465,418 A 11/1995 Zhou et al. ................. 455/332
5,471,162 A 11/1995 McEwan ..................... 327/92
5,471,665 A 11/1995 Pace et al.
5,479,120 A 12/1995 McEwan ..................... 327/91
5,479,447 A 12/1995 Chow et al. ................ 375/260
5,481,570 A 1/1996 Winters
5,483,193 A 1/1996 Kennedy et al. ............ 329/300
5,483,549 A 1/1996 Weinberg et al. ........... 375/200
5,483,600 A 1/1996 Werrbach
5,483,691 A 1/1996 Heck et al. .............. 455/234.2
5,483,695 A 1/1996 Pardoen
5,490,173 A 2/1996 Whikehart et al. ......... 375/316
5,490,176 A 2/1996 Peltier
5,493,581 A 2/1996 Young et al. ............... 375/350
5,493,721 A 2/1996 Reis ........................... 455/339
5,495,200 A 2/1996 Kwan et al. ................ 327/554
5,495,202 A 2/1996 Hsu ........................... 327/113
5,495,500 A 2/1996 Jovanovich et al. ........ 375/206
5,499,267 A 3/1996 Ohe et al. ................... 375/206
5,500,758 A 3/1996 Thompson et al. ......... 359/189
5,513,389 A 4/1996 Reeser et al. ............... 455/311
5,515,014 A 5/1996 Troutman ................... 332/178
5,517,688 A 5/1996 Fajen et al. ................. 455/333
5,519,890 A 5/1996 Pinckley ..................... 455/307
5,523,719 A 6/1996 Longo et al. ............... 327/557
5,523,726 A 6/1996 Kroeger et al. ............. 332/103
5,523,760 A 6/1996 McEwan ..................... 342/89
5,539,770 A 7/1996 Ishigaki ...................... 375/206
5,555,453 A 9/1996 Kajimoto et al. ........... 455/266
5,557,641 A 9/1996 Weinberg ................... 375/295
5,557,642 A 9/1996 Williams .................... 375/316
5,563,550 A 10/1996 Toth ........................... 329/347
5,564,097 A 10/1996 Swanke
5,574,755 A 11/1996 Persico ....................... 375/295
5,579,341 A 11/1996 Smith et al. ................ 375/267
5,579,347 A 11/1996 Lindquist et al. ........... 375/346
5,584,068 A 12/1996 Mohindra ................... 455/324
5,589,793 A 12/1996 Kassapian
5,592,131 A 1/1997 Labreche et al. ........... 332/103
5,600,680 A 2/1997 Mishima et al.
5,602,847 A 2/1997 Pagano et al. .............. 370/484
5,602,868 A 2/1997 Wilson ....................... 375/219
5,604,592 A 2/1997 Kotidis et al. .............. 356/357
5,604,732 A 2/1997 Kim et al. .................. 370/342
5,606,731 A 2/1997 Pace et al.
5,608,531 A 3/1997 Honda et al. .................. 386/1
5,610,946 A 3/1997 Tanaka et al. .............. 375/269
RE35,494 E 4/1997 Nicollini ..................... 327/554
5,617,451 A 4/1997 Mimura et al. ............. 375/340
5,619,538 A 4/1997 Sempel et al. .............. 375/328
5,621,455 A 4/1997 Rogers et al. ................. 348/6
5,628,055 A 5/1997 Stein ........................... 455/89
5,630,227 A 5/1997 Bella et al. ................. 455/324
5,633,815 A 5/1997 Young
5,634,207 A 5/1997 Yamaji et al.
5,636,140 A 6/1997 Lee et al.
5,638,396 A 6/1997 Klimek ........................ 372/92
5,640,415 A 6/1997 Pandula ...................... 375/202
5,640,424 A 6/1997 Banavong et al. .......... 375/316
5,640,428 A 6/1997 Abe et al. ................... 375/334
5,640,698 A 6/1997 Shen et al. ................. 455/323
5,642,071 A 6/1997 Sevenhans et al.
5,648,985 A 7/1997 Bjerede et al. ............. 375/219
5,650,785 A 7/1997 Rodal ........................ 342/357
5,661,424 A 8/1997 Tang .......................... 327/105
5,663,878 A 9/1997 Walker ....................... 363/159
5,663,986 A 9/1997 Striffler ...................... 375/260
5,668,836 A 9/1997 Smith et al. ................ 375/316
5,675,392 A 10/1997 Nayebi et al. .............. 348/584
5,678,220 A 10/1997 Fournier ..................... 455/302
5,678,226 A 10/1997 Li et al.
5,680,078 A 10/1997 Ariie .......................... 332/178
5,680,418 A 10/1997 Croft et al. ................. 375/346
5,682,099 A 10/1997 Thompson et al.
5,689,413 A 11/1997 Jaramillo et al. ........... 363/146
5,694,096 A 12/1997 Ushiroku et al. ........... 333/195
5,697,074 A 12/1997 Makikallio et al.
5,699,006 A 12/1997 Zele et al. .................. 327/341
5,705,949 A 1/1998 Alelyunas et al. .......... 329/304
5,705,955 A 1/1998 Freeburg et al. .............. 331/14
5,710,992 A * 1/1998 Sawada et al. .......... 455/161.2
5,710,998 A 1/1998 Opas .......................... 455/324
5,714,910 A 2/1998 Skoczen et al. ............... 331/3
5,715,281 A 2/1998 Bly et al. ................... 375/344
5,721,514 A 2/1998 Crockett et al. ............... 331/3
5,724,002 A 3/1998 Hulick ....................... 329/361
5,724,653 A 3/1998 Baker et al. ................ 455/296
5,729,577 A 3/1998 Chen .......................... 375/334
5,729,829 A 3/1998 Talwar et al. ................. 455/63
5,732,333 A 3/1998 Cox et al. ................... 455/126
5,736,895 A 4/1998 Yu et al. ..................... 327/554
5,737,035 A 4/1998 Rotzoll ....................... 348/725
5,742,189 A 4/1998 Yoshida et al. ............. 327/113
5,745,846 A 4/1998 Myer et al.
5,748,683 A 5/1998 Smith et al. ................ 375/347
5,751,154 A 5/1998 Tsugai
5,757,858 A 5/1998 Black et al.
5,757,870 A 5/1998 Miya et al. ................. 375/367
RE35,829 E 6/1998 Sanderford, Jr. ............ 375/200
5,760,629 A 6/1998 Urabe et al.
5,760,632 A 6/1998 Kawakami et al.
5,760,645 A 6/1998 Comte et al. ............... 329/304
5,764,087 A 6/1998 Clark ......................... 327/105
5,767,726 A 6/1998 Wang ......................... 327/356
5,768,118 A 6/1998 Faulk et al. .................. 363/72
5,768,323 A 6/1998 Kroeger et al. ............. 375/355
5,770,985 A 6/1998 Ushiroku et al. ........... 333/193
5,771,442 A 6/1998 Wang et al. .................. 455/93
5,777,692 A 7/1998 Ghosh ........................ 348/725
5,777,771 A 7/1998 Smith ......................... 359/180
5,778,022 A 7/1998 Walley ....................... 375/206
5,784,689 A 7/1998 Kobayashi
5,786,844 A 7/1998 Rogers et al. ................. 348/6
5,790,587 A * 8/1998 Smith et al. ................ 375/200
5,793,801 A 8/1998 Fertner ....................... 375/219
5,793,817 A 8/1998 Wilson

| Patent | Kind | Date | Inventor | Class |
|---|---|---|---|---|
| 5,793,818 | A | 8/1998 | Claydon et al. | 375/326 |
| 5,801,654 | A | 9/1998 | Traylor | 341/144 |
| 5,802,463 | A | 9/1998 | Zuckerman | 455/208 |
| 5,809,060 | A | 9/1998 | Cafarella et al. | 375/206 |
| 5,812,546 | A | 9/1998 | Zhou et al. | 370/342 |
| 5,818,582 | A | 10/1998 | Fernandez et al. | 356/318 |
| 5,818,869 | A | 10/1998 | Miya et al. | 375/206 |
| 5,825,254 | A | 10/1998 | Lee | 331/25 |
| 5,834,979 | A | 11/1998 | Yatsuka | |
| 5,834,985 | A | 11/1998 | Sundegård | 332/100 |
| 5,841,324 | A | 11/1998 | Williams | 331/17 |
| 5,841,811 | A | 11/1998 | Song | 375/235 |
| 5,844,449 | A | 12/1998 | Abeno et al. | 332/105 |
| 5,844,868 | A | 12/1998 | Takahashi et al. | |
| 5,859,878 | A | 1/1999 | Phillips et al. | 375/316 |
| 5,864,754 | A | 1/1999 | Hotto | 455/280 |
| 5,870,670 | A | 2/1999 | Ripley et al. | |
| 5,872,446 | A | 2/1999 | Cranford, Jr. et al. | 323/315 |
| 5,881,375 | A | 3/1999 | Bonds | 455/118 |
| 5,883,548 | A | 3/1999 | Assard et al. | 329/306 |
| 5,892,380 | A | 4/1999 | Quist | 327/172 |
| 5,894,239 | A | 4/1999 | Bonaccio et al. | 327/176 |
| 5,894,496 | A | 4/1999 | Jones | 455/126 |
| 5,896,304 | A | 4/1999 | Tiemann et al. | |
| 5,896,562 | A | 4/1999 | Heinonen | 455/76 |
| 5,898,912 | A | 4/1999 | Heck et al. | |
| 5,900,747 | A | 5/1999 | Brauns | 327/9 |
| 5,901,054 | A | 5/1999 | Leu et al. | 363/41 |
| 5,901,187 | A | 5/1999 | Iinuma | 375/347 |
| 5,901,344 | A | 5/1999 | Opas | 455/76 |
| 5,901,347 | A | 5/1999 | Chambers et al. | 455/234.1 |
| 5,901,348 | A | 5/1999 | Bang et al. | 455/254 |
| 5,901,349 | A | 5/1999 | Guegnaud et al. | 455/302 |
| 5,903,178 | A | 5/1999 | Miyatsuji et al. | 327/308 |
| 5,903,187 | A | 5/1999 | Claverie et al. | 329/342 |
| 5,903,196 | A | 5/1999 | Salvi et al. | 331/16 |
| 5,903,421 | A | 5/1999 | Furutani et al. | 361/58 |
| 5,903,553 | A | 5/1999 | Sakamoto et al. | 370/338 |
| 5,903,595 | A | 5/1999 | Suzuki | 375/207 |
| 5,903,609 | A | 5/1999 | Kool et al. | 375/261 |
| 5,903,827 | A | 5/1999 | Kennan et al. | 455/326 |
| 5,903,854 | A | 5/1999 | Abe et al. | 455/575 |
| 5,905,449 | A | 5/1999 | Tsubouchi et al. | 340/925.69 |
| 5,907,149 | A | 5/1999 | Marckini | 235/487 |
| 5,907,197 | A | 5/1999 | Faulk | 307/119 |
| 5,909,447 | A | 6/1999 | Cox et al. | 370/508 |
| 5,911,116 | A | 6/1999 | Nosswitz | 455/83 |
| 5,911,123 | A | 6/1999 | Shaffer et al. | 455/554 |
| 5,914,622 | A | 6/1999 | Inoue | 327/172 |
| 5,915,278 | A | 6/1999 | Mallick | 73/658 |
| 5,920,199 | A | 7/1999 | Sauer | 324/678 |
| 5,926,065 | A | 7/1999 | Wakai et al. | 329/304 |
| 5,926,513 | A | 7/1999 | Suominen et al. | |
| 5,933,467 | A | 8/1999 | Sehier et al. | 375/350 |
| 5,937,013 | A * | 8/1999 | Lam et al. | 375/340 |
| 5,943,370 | A | 8/1999 | Smith | 375/334 |
| 5,945,660 | A | 8/1999 | Nakasuji et al. | 235/462.46 |
| 5,949,827 | A | 9/1999 | DeLuca et al. | |
| 5,952,895 | A | 9/1999 | McCune, Jr. et al. | 332/128 |
| 5,953,642 | A | 9/1999 | Feldtkeller et al. | 455/195.1 |
| 5,955,992 | A | 9/1999 | Shattil | |
| 5,959,850 | A | 9/1999 | Lim | 363/17 |
| 5,960,033 | A | 9/1999 | Shibano et al. | 375/207 |
| 5,970,053 | A | 10/1999 | Schick et al. | |
| 5,982,315 | A | 11/1999 | Bazarjani et al. | |
| 5,982,329 | A | 11/1999 | Pittman et al. | |
| 5,995,030 | A | 11/1999 | Cabler | |
| 5,999,561 | A | 12/1999 | Naden et al. | |
| 6,005,903 | A | 12/1999 | Mendelovicz | |
| 6,011,435 | A | 1/2000 | Takeyabu et al. | |
| 6,014,176 | A | 1/2000 | Nayebi et al. | |
| 6,014,551 | A | 1/2000 | Pesola et al. | |
| 6,018,262 | A | 1/2000 | Noro et al. | |
| 6,018,553 | A | 1/2000 | Sanielevici et al. | |
| 6,026,286 | A | 2/2000 | Long | |
| 6,028,887 | A | 2/2000 | Harrison et al. | 375/206 |
| 6,031,217 | A | 2/2000 | Aswell et al. | |
| 6,041,073 | A | 3/2000 | Davidovici et al. | 375/148 |
| 6,047,026 | A | 4/2000 | Chao et al. | |
| 6,049,573 | A | 4/2000 | Song | |
| 6,049,706 | A | 4/2000 | Cook et al. | 455/313 |
| 6,054,889 | A | 4/2000 | Kobayashi | 327/357 |
| 6,061,551 | A | 5/2000 | Sorrells et al. | 455/118 |
| 6,061,555 | A | 5/2000 | Bultman et al. | 455/313 |
| 6,064,054 | A | 5/2000 | Waczynski et al. | |
| 6,067,329 | A | 5/2000 | Kato et al. | |
| 6,073,001 | A | 6/2000 | Sokoler | |
| 6,076,015 | A | 6/2000 | Hartley et al. | |
| 6,078,630 | A | 6/2000 | Prasanna | |
| 6,081,691 | A | 6/2000 | Renard et al. | 455/12.1 |
| 6,084,465 | A | 7/2000 | Dasgupta | |
| 6,084,922 | A | 7/2000 | Zhou et al. | 375/316 |
| 6,085,073 | A | 7/2000 | Palermo et al. | |
| 6,091,289 | A | 7/2000 | Song et al. | |
| 6,091,939 | A | 7/2000 | Banh | 455/102 |
| 6,091,940 | A | 7/2000 | Sorrells et al. | 455/118 |
| 6,091,941 | A | 7/2000 | Moriyama et al. | 455/126 |
| 6,094,084 | A | 7/2000 | Abou-Allam et al. | |
| 6,098,046 | A | 8/2000 | Cooper et al. | |
| 6,098,886 | A | 8/2000 | Swift et al. | 235/472.01 |
| 6,121,819 | A | 9/2000 | Traylor | 327/359 |
| 6,125,271 | A | 9/2000 | Rowland et al. | 455/313 |
| 6,144,236 | A | 11/2000 | Vice et al. | 327/113 |
| 6,144,331 | A | 11/2000 | Jiang | |
| 6,144,846 | A | 11/2000 | Durec | 455/323 |
| 6,147,340 | A | 11/2000 | Levy | 250/214 R |
| 6,147,763 | A | 11/2000 | Steinlechner | 356/484 |
| 6,150,890 | A | 11/2000 | Damgaard et al. | 331/14 |
| 6,151,354 | A | 11/2000 | Abbey | |
| 6,160,280 | A | 12/2000 | Bonn et al. | |
| 6,169,733 | B1 | 1/2001 | Lee | |
| 6,175,728 | B1 | 1/2001 | Mitama | 455/323 |
| 6,178,319 | B1 | 1/2001 | Kashima | |
| 6,204,789 | B1 | 3/2001 | Nagata | |
| 6,208,636 | B1 | 3/2001 | Tawil et al. | |
| 6,211,718 | B1 | 4/2001 | Souetinov | |
| 6,212,369 | B1 | 4/2001 | Avasarala | |
| 6,215,475 | B1 | 4/2001 | Meyerson et al. | 345/173 |
| 6,225,848 | B1 | 5/2001 | Tilley et al. | |
| 6,230,000 | B1 | 5/2001 | Tayloe | |
| 6,266,518 | B1 | 7/2001 | Sorrells et al. | 455/118 |
| 6,307,894 | B1 | 10/2001 | Eidson et al. | |
| 6,308,058 | B1 | 10/2001 | Souetinov et al. | |
| 6,313,685 | B1 | 11/2001 | Rabii | |
| 6,314,279 | B1 | 11/2001 | Mohindra | |
| 6,317,589 | B1 | 11/2001 | Nash | |
| 6,321,073 | B1 | 11/2001 | Luz et al. | |
| 6,327,313 | B1 | 12/2001 | Traylor et al. | |
| 6,330,244 | B1 | 12/2001 | Swartz et al. | |
| 6,335,656 | B1 | 1/2002 | Goldfarb et al. | |
| 6,353,735 | B1 | 3/2002 | Sorrells et al. | 455/118 |
| 6,363,262 | B1 | 3/2002 | McNicol | |
| 6,366,622 | B1 | 4/2002 | Brown et al. | |
| 6,370,371 | B1 | 4/2002 | Sorrells et al. | 455/323 |
| 6,385,439 | B1 | 5/2002 | Hellberg | |
| 6,400,963 | B1 | 6/2002 | Glöckler et al. | |
| 6,421,534 | B1 | 7/2002 | Cook et al. | |
| 6,437,639 | B1 | 8/2002 | Nguyen et al. | |
| 6,459,721 | B1 | 10/2002 | Mochizuki et al. | |
| 6,509,777 | B1 | 1/2003 | Razavi et al. | |
| 6,516,185 | B1 | 2/2003 | MacNally | |
| 6,531,979 | B1 | 3/2003 | Hynes | |
| 6,542,722 | B1 | 4/2003 | Sorrells et al. | |
| 6,560,301 | B1 | 5/2003 | Cook et al. | |
| 6,580,902 | B1 | 6/2003 | Sorrells et al. | |
| 6,600,795 | B1 | 7/2003 | Ohta et al. | |

| | | | |
|---|---|---|---|
| 6,600,911 B1 | 7/2003 | Morishige et al. |
| 6,608,647 B1 | 8/2003 | King |
| 6,611,569 B1 | 8/2003 | Schier et al. |
| 6,633,194 B1 | 10/2003 | Arnborg et al. |
| 6,634,555 B1 | 10/2003 | Sorrells et al. |
| 6,647,250 B1 | 11/2003 | Bultman et al. |
| 6,686,879 B1 | 2/2004 | Shattil |
| 6,687,493 B1 | 2/2004 | Sorrells et al. |
| 6,690,232 B1 | 2/2004 | Ueno et al. |
| 6,694,128 B1 | 2/2004 | Sorrells et al. |
| 6,697,603 B1 | 2/2004 | Lovinggood et al. |
| 6,704,549 B1 | 3/2004 | Sorrells et al. |
| 6,704,558 B1 | 3/2004 | Sorrells et al. |
| 6,741,139 B1 | 5/2004 | Pleasant et al. |
| 6,798,351 B1 | 9/2004 | Sorrells et al. |
| 6,813,485 B1 | 11/2004 | Sorrells et al. |
| 6,823,178 B1 | 11/2004 | Pleasant et al. |
| 6,836,650 B1 | 12/2004 | Sorrells et al. |
| 6,850,742 B1 | 2/2005 | Fayyaz |
| 6,853,690 B1 | 2/2005 | Sorrells et al. |
| 6,873,836 B1 | 3/2005 | Sorrells et al. |
| 2001/0036818 A1 | 11/2001 | Dobrovolny |
| 2002/0037706 A1 | 3/2002 | Ichihara |

FOREIGN PATENT DOCUMENTS

| | | |
|---|---|---|
| DE | 42 37 692 C1 | 3/1994 |
| DE | 196 27 640 A1 | 1/1997 |
| DE | 197 35 798 C1 | 7/1998 |
| EP | 0 035 166 A1 | 9/1981 |
| EP | 0 087 336 A1 | 8/1983 |
| EP | 0 099 265 A1 | 1/1984 |
| EP | 0 087 336 B1 | 7/1986 |
| EP | 0 254 844 A2 | 2/1988 |
| EP | 0 276 130 A2 | 7/1988 |
| EP | 0 276 130 A3 | 7/1988 |
| EP | 0 193 899 B1 | 6/1990 |
| EP | 0 380 351 A2 | 8/1990 |
| EP | 0 380 351 A3 | 2/1991 |
| EP | 0 411 840 A2 | 2/1991 |
| EP | 0 423 718 A2 | 4/1991 |
| EP | 0 411 840 A3 | 7/1991 |
| EP | 0 486 095 A1 | 5/1992 |
| EP | 0 423 718 A3 | 8/1992 |
| EP | 0 512 748 A2 | 11/1992 |
| EP | 0 529 836 A1 | 3/1993 |
| EP | 0 548 542 A1 | 6/1993 |
| EP | 0 512 748 A3 | 7/1993 |
| EP | 0 560 228 A1 | 9/1993 |
| EP | 0 632 288 A2 | 1/1995 |
| EP | 0 632 577 A1 | 1/1995 |
| EP | 0 643 477 A2 | 3/1995 |
| EP | 0 643 477 A3 | 3/1995 |
| EP | 0 411 840 B1 | 10/1995 |
| EP | 0 696 854 A1 | 2/1996 |
| EP | 0 632 288 A3 | 7/1996 |
| EP | 0 732 803 A1 | 9/1996 |
| EP | 0 486 095 B1 | 2/1997 |
| EP | 0 782 275 A2 | 7/1997 |
| EP | 0 785 635 A1 | 7/1997 |
| EP | 0 789 449 A2 | 8/1997 |
| EP | 0 795 955 A2 | 9/1997 |
| EP | 0 795 955 A3 | 9/1997 |
| EP | 0 795 978 A2 | 9/1997 |
| EP | 0 817 369 A2 | 1/1998 |
| EP | 0 817 369 A3 | 1/1998 |
| EP | 0 837 565 A1 | 4/1998 |
| EP | 0 862 274 A1 | 9/1998 |
| EP | 0 874 499 A2 | 10/1998 |
| EP | 0 512 748 B1 | 11/1998 |
| EP | 0 877 476 A1 | 11/1998 |
| EP | 0 977 351 A1 | 2/2000 |
| FR | 2 245 130 | 4/1975 |
| FR | 2 669 787 A1 | 5/1992 |
| FR | 2 743 231 A1 | 7/1997 |
| GB | 2 161 344 A | 1/1986 |
| GB | 2 215 945 A | 9/1989 |
| GB | 2 324 919 A | 11/1998 |
| JP | 47-2314 | 2/1972 |
| JP | 55-66057 | 5/1980 |
| JP | 56-114451 | 9/1981 |
| JP | 58-7903 | 1/1983 |
| JP | 58-133004 | 8/1983 |
| JP | 59-144249 | 8/1984 |
| JP | 60-58705 | 4/1985 |
| JP | 61-30821 | 2/1986 |
| JP | 63-54002 | 3/1988 |
| JP | 63-65587 | 3/1988 |
| JP | 63-153691 | 6/1988 |
| JP | 2-39632 | 2/1990 |
| JP | 2-131629 | 5/1990 |
| JP | 2-276351 | 11/1990 |
| JP | 4-123614 | 4/1992 |
| JP | 4-127601 | 4/1992 |
| JP | 5-175730 | 7/1993 |
| JP | 5-175734 | 7/1993 |
| JP | 5-327356 | 12/1993 |
| JP | 6-237276 | 8/1994 |
| JP | 7-154344 | 6/1995 |
| JP | 7-307620 | 11/1995 |
| JP | 8-23359 | 1/1996 |
| JP | 8-32556 | 2/1996 |
| JP | 8-139524 | 5/1996 |
| WO | WO 80/01633 A1 | 8/1980 |
| WO | WO 91/18445 A1 | 11/1991 |
| WO | WO 94/05087 A1 | 3/1994 |
| WO | WO 95/01006 A1 | 1/1995 |
| WO | WO 96/02977 A1 | 2/1996 |
| WO | WO 96/08078 A1 | 3/1996 |
| WO | WO 96/39750 A1 | 12/1996 |
| WO | WO 97/08839 A2 | 3/1997 |
| WO | WO 97/08839 A3 | 3/1997 |
| WO | WO 97/38490 A1 | 10/1997 |
| WO | WO 98/00953 A1 | 1/1998 |
| WO | WO 98/24201 A1 | 6/1998 |
| WO | WO 98/40968 A2 | 9/1998 |
| WO | WO 98/40968 A3 | 9/1998 |
| WO | WO 99/23755 A1 | 5/1999 |

OTHER PUBLICATIONS

Akers, N.P. et al., “RF Sampling Gates: a Brief Review,” *IEE Proceedings*, IEE, vol. 133, Part A, No. 1, pp. 45-49 (Jan. 1986).

Al-Ahmad, H.A.M. et al., “Doppler Frequency Correction for a Non-Geostationary Communications Satellite. Techniques for CERS and T-SAT,” *Electronics Division Colloquium on Low Noise Oscillators and Synthesizers*, IEE, pp. 4/1-4/5 (Jan. 23, 1986).

Ali, I. et al., “Doppler Characterization for LEO Satellites,” *IEEE Transactions on Communications*, IEEE, vol. 46, No. 3, pp. 309-313 (Mar. 1998).

Allan, D.W., “Statistics of Atomic Frequency Standards,” *Proceedings Of The IEEE Special Issue on Frequency Stability*, IEEE, pp. 221-230 (Feb. 1966).

Allstot, D.J. et al., “MOS Switched Capacitor Ladder Filters, ” *IEEE Journal of Solid-State Circuits*, IEEE, vol. SC-13, No. 6, pp. 806-814 (Dec. 1978).

Allstot, D.J. and Black Jr. W.C., “Technological Design Considerations for Monolithic MOS Switched-Capacitor Filtering Systems,” *Proceedings of the IEEE*, IEEE, vol. 71, No. 8, pp. 967-986 (Aug. 1983).

Alouini, M. et al., "Channel Characterization and Modeling for Ka-Band Very Small Aperture Terminals," *Proceedings Of the IEEE*, IEEE, vol. 85, No. 6, pp. 981-997 (Jun. 1997).

Andreyev, G.A. and Ogarev, S.A., "Phase Distortions of Keyed Millimeter-Wave Signals in the Case of Propagation in a Turbulent Atmosphere," *Telecommunications and Radio Engineering*, Scripta Technica, vol. 43, No. 12, pp. 87-90 (Dec. 1988).

Antonetti, A. et al., "Optoelectronic Sampling in the Picosecond Range," *Optics Communications*, North-Holland Publishing Company, vol. 21, No. 2, pp. 211-214 (May 1977).

Austin, J. et al., "Doppler Correction of the Telecommunication Payload Oscillators in the UK T-SAT," *18th European Microwave Conference*, Microwave Exhibitions and Publishers Ltd., pp. 851-857 (Sep. 12-15, 1988).

Auston, D.H., "Picosecond optoelectronic switching and gating in silicon," *Applied Physics Letters*, American Institute of Physics, vol. 26, No. 3, pp. 101-103 (Feb. 1, 1975).

Baher, H., "Transfer Functions for Switched-Capacitor and Wave Digital Filters," *IEEE Transactions on Circuits and Systems*, IEEE Circuits and Systems Society, vol. CAS-33, No. 11, pp. 1138-1142 (Nov. 1986).

Baines, R., "The DSP Bottleneck," *IEEE Communications Magazine*, IEEE Communications Society, pp. 46-54 (May 1995).

Banjo, O.P. and Vilar, E., "Binary Error Probabilities on Earth-Space Links Subject to Scintillation Fading," *Electronics Letters*, IEE, vol. 21, No. 7, pp. 296-297 (Mar. 28, 1985).

Banjo, O.P. and Vilar, E., "The Dependence of Slant Path Amplitude Scintillations on Various Meteorological Parameters," *Fifth International Conference on Antennas and Propagation (ICAP 87) Part 2: Propagation*, IEE, pp. 277-280 (Mar. 30 - Apr. 2, 1987).

Banjo, O.P. and Vilar, E. "Measurement and Modeling of Amplitude Scintillations on Low-Elevation Earth-Space Paths and Impact on Communication Systems," *IEEE Transactions on Communications*, IEEE Communications Society, vol. COM-34, No. 8, pp. 774-780 (Aug. 1986).

Banjo, O.P. et al., "Tropospheric Amplitude Spectra Due to Absorption and Scattering in Earth-Space Paths," *Fourth International Conference on Antennas and Propagation* (*ICAP 85*), IEE, pp. 77-82 (Apr. 16-19, 1985).

Basili, P. et al., "Case Study of Intense Scintillation Events on the OTS Path," *IEEE Transactions on Antennas and Propagation*, IEEE, vol. 38, No. 1, pp. 107-113 (Jan. 1990).

Basili, P. et al., "Observation of High $C^2$ and Turbulent Path Length on OTS Space-Earth Link," *Electronics Letters*, IEE, vol. 24, No. 17, pp. 1114-1116 (Aug. 18, 1988).

Blakey, J.R. et al., "Measurement of Atmospheric Millimetre-Wave Phase Scintillations in an Absorption Region," *Electronics Letters*, IEE, vol. 21, No. 11, pp. 486-487 (May 23, 1985).

Burgueño, A. et al., "Influence of rain gauge integration time on the rain rate statistics used in microwave communications," *annales des tèlècommunications*, International Union of Radio Science, pp. 522-527 (Sep./Oct. 1988).

Burgueño, A. et al., "Long-Term Joint Statistical Analysis of Duration and Intensity of Rainfall Rate with Application to Microwave Communications," *Fifth International Conference on Antennas and Propagation* (*ICAP 87*) *Part 2: Propagation*, IEE, pp. 198-201 (Mar. 30 - Apr. 2, 1987).

Burgueño, A. et al., "Long Term Statistics of Precipitation Rate Return Periods in the Context of Microwave Communications," *Sixth International Conference on Antennas and Propagation* (*ICAP 89*) *Part 2: Propagation*, IEE, pp. 297-301 (Apr. 4-7, 1989).

Burgueño, A. et al., "Spectral Analysis of 49 Years of Rainfall Rate and Relation to Fade Dynamics," *IEEE Transactions on Communications*, IEEE Communications Society, vol. 38, No. 9, pp. 1359-1366 (Sep. 1990).

Catalan, C. and Vilar, E., "Approach for satellite slant path remote sensing," *Electronics Letters*, IEE, vol. 34, No. 12, pp. 1238-1240 (Jun. 11, 1998).

Chan, P. et al., "A Highly Linear 1-GHz CMOS Downconversion Mixer," *European Solid State Circuits Conference*, IEEE Communication Society, pp. 210-213 (Sep. 22-24, 1993).

Declaration of Michael J. Bultman filed in U.S. Appl. No. 09/176,022, which is directed to related subject matter.

Declaration of Robert W. Cook filed in U.S. Appl. No. 09/176,022, which is directed to related subject matter.

Declaration of Alex Holtz filed in U.S. Appl. No. 09/176, 022, which is directed to related subject matter.

Declaration of Richard C. Looke filed in U.S. Appl. No. 09/176,022, which is directed to related subject matter.

Declaration of Charley D. Moses, Jr. filed in U.S. Appl. No. 09/176,022, which is directed to related subject matter.

Declaration of Jeffrey L. Parker and David F. Sorrells, with attachment Exhibit 1, filed in U.S. Appl. No. 09/176,022, which is directed to related subject matter.

Dewey, R.J. and Collier, C.J., "Multi-Mode Radio Receiver, " *Electronics Division Colloquium on Digitally Implemented Radios*, IEE, pp. 3/1-3/5 (Oct. 18, 1985).

DIALOG File 347 (JAPIO) English Language Patent Abstract for JP 2-276351, published Nov. 13, 1990, (1 Page).

DIALOG File 347 (JAPIO) English Language Patent Abstract for JP 2-131629, published May 21, 1990, (1 Page).

DIALOG File 347 (JAPIO) English Language Patent Abstract for JP 2-39632, published Feb. 8, 1990, (1 Page).

DIALOG File 348 (European Patents) English Language Patent Abstract for EP 0 785 635 A1, published Dec. 26, 1996, (3 Pages).

DIALOG File 348 (European Patents) English Language Patent Abstract for EP 35166 A1, published Feb. 18, 1981, (2 Pages).

"DSO takes sampling rate to 1 Ghz," *Electronic Engineering*, Morgan Grampian Publishers, vol. 59, No. 723, pp. 77 and 79 (Mar. 1987).

Erdi, G. and Henneuse, P.R., "A Precision FET-Less Sample-and-Hold with High Charge-to-Droop Current Ratio," *IEEE Journal of Solid-State Circuits*, IEEE, vol. SC-13, No. 6, pp. 864-873 (Dec. 1978).

Faulkner, N.D. and Vilar, E., "Subharmonic Sampling for the Measurement of Short Term Stability of Microwave Oscillators," *IEEE Transactions on Instrumentation and Measurement*, IEEE, vol. IM-32, No. 1, pp. 208-213 (Mar. 1983).

Faulkner, N.D. et al., "Sub-Harmonic Sampling for the Accurate Measurement of Frequency Stability of Microwave Oscillators," *CPEM 82 Digest: Conference on Precision Electromagnetic Measurements*, IEEE, pp. M-10 and M-11 (1982).

Faulkner, N.D. and Vilar, E., "Time Domain Analysis of Frequency Stability Using Non-Zero Dead-Time Counter Techniques," *CPEM 84 Digest Conference on Precision Electromagnetic Measurements*, IEEE, pp. 81-82 (1984).

Filip, M. and Vilar, E., "Optimum Utilization of the Channel Capacity of a Satellite Link in the Presence of Amplitude Scintillations and Rain Attenuation," *IEEE Transactions on Communications*, IEEE Communications Society, vol. 38, No. 11, pp. 1958-1965 (Nov. 1990).

Fukahori, K., "A CMOS Narrow-Band Signaling Filter with Q Reduction," *IEEE Journal of Solid-State Circuits*, IEEE, vol. SC-19, No. 6, pp. 926-932 (Dec. 1984).

Fukuchi, H. and Otsu, Y., "Available time statistics of rain attenuation on earth-space path," *IEE Proceedings-H: Microwaves, Antennas and Propagation*, IEE, vol. 135, Pt. H, No. 6, pp. 387-390 (Dec. 1988).

Gibbins, C.J. and Chadha, R., "Millimetre-wave propagation through hydrocarbon flame," *IEE Proceedings*, IEE vol. 134, Pt. H, No. 2 , pp. 169-173 (Apr. 1987).

Gilchrist, B. et al., "Sampling hikes performance of frequency synthesizers," *Microwaves & RF*, Hayden Publishing, vol. 23, No. 1, pp. 93-94 and 110 (Jan. 1984).

Gossard, E.E., "Clear weather meteorological effects on propagation at frequencies above 1 Ghz," *Radio Science*, American Geophysical Union, vol. 16, No. 5, pp. 589-608 (Sep. - Oct. 1981).

Gregorian, R. et al., "Switched-Capacitor Circuit Design," *Proceedings of the IEEE*, IEEE, vol. 71, No. 8, pp. 941-966 (Aug. 1983).

Groshong et al., "Undersampling Techniques Simplify Digital Radio," *Electronic Design*, Penton Publishing, pp. 67-68, 70, 73-75 and 78 (May 23, 1991).

Grove, W.M., "Sampling for Oscilloscopes and Other RF Systems: Dc through X-Band," *IEEE Transactions on Microwave Theory and Techniques*, IEEE, pp. 629-635 (Dec. 1966).

Haddon, J. et al., "Measurement of Microwave Scintillations on a Satellite Down-Link at X-Band," *Antennas and Propagation*, IEE, pp. 113-117 (1981).

Haddon, J. and Vilar, E., "Scattering Induced Microwave Scintillations from Clear Air and Rain on Earth Space Paths and the Influence of Antenna Aperture," *IEEE Transactions on Antennas and Propagation*, IEEE, vol. AP-34, No. 5, pp. 646-657 (May 1986).

Hafdallah, H. et al., "2-4 Ghz MESFET Sampler," *Electronics Letters*, IEE, vol. 24, No. 3, pp. 151-153 (Feb. 4, 1988).

Herben, M.H.A.J., "Amplitude and Phase Scintillations Measurements on 8-2 km Line-Of-Sight Path at 30 Ghz," *Electronics Letters*, IEE, vol. 18, No. 7, pp. 287-289 (Apr. 1, 1982).

Hewitt, A. et al., "An 18 Ghz Wideband LOS Multipath Experiment," *International Conference on Measurements for Telecommunication Transmission Systems—MTTS 85*, IEE, pp. 112-116 (Nov. 27-28, 1985).

Hewitt, A. et al., "An Autoregressive Approach to the Identification of Multipath Ray Parameters from Field Measurements," *IEEE Transactions on Communications*, IEEE Communications Society, vol. 37, No. 11, pp. 1136-1143 (Nov. 1989).

Hewitt, A. and Vilar, E., "Selective fading on LOS Microwave Links: Classical and Spread-Spectrum Measurement Techniques," *IEEE Transactions on Communications*, IEEE Communications Society, vol. 36, No. 7, pp. 789-796 (Jul. 1988).

Hospitalier, E., "Instruments for Recording and Observing Rapidly Varying Phenomena," *Science Abstracts*, IEE, vol. VII, pp. 22-23 (1904).

Howard, I.M. and Swansson, N.S., "Demodulating High Frequency Resonance Signals for Bearing Fault Detection," *The Institution of Engineers Australia Vibration and Noise Conference*, Institution of Engineers, Australia, pp. 115-121 (Sep. 18-20, 1990).

Hu, X., *A Switched-Current Sample-and-Hold Amplifier for FM Demodulation*, Thesis for Master of Applied Science, Dept. of Electrical and Computer Engineering, University of Toronto, UMI Dissertation Services, pp. 1-64 (1995).

Hung, H-L. A. et al., "Characterization of Microwave Integrated Circuits Using An Optical Phase-Locking and Sampling System," *IEEE MTT-S Digest*, IEEE, pp. 507-510 (1991).

Hurst, P.J., "Shifting the Frequency Response of Switched-Capacitor Filters by Nonuniform Sampling," *IEEE Transactions on Circuits and Systems*, IEEE Circuits and Systems Society, vol. 38, No. 1, pp. 12-19 (Jan. 1991).

Itakura, T., "Effects of the sampling pulse width on the frequency characteristics of a sample-and-hold circuit," *IEE Proceedings Circuits, Devices and Systems*, IEE, vol. 141, No. 4, pp. 328-336 (Aug. 1994).

Janssen, J.M.L., "An Experimental 'Stroboscopic' Oscilloscope for Frequencies up to about 50 Mc/s: I. Fundamentals, " *Philips Technical Review*, Philips Research Laboratories, vol. 12, No. 2, pp. 52-59 (Aug. 1950).

Janssen, J.M.L. and Michels, A.J., "An Experimental 'Stroboscopic' Oscilloscope for Frequencies up to about 50 Mc/s: II. Electrical Build-Up," *Philips Technical Review*, Philips Research Laboratories, vol. 12, No. 3, pp. 73-82 (Sep. 1950).

Jondral, V.F. et al., "Doppler Profiles for Communication Satellites," *Frequenz*, Herausberger, pp. 111-116 (May-Jun. 1996).

Kaleh, G.K., "A Frequency Diversity Spread Spectrum System for Communication in the Presence of In-band Interference," *1995 IEEE Globecom*, IEEE Communications Society, pp. 66-70 (1995).

Karasawa, Y. et al., "A New Prediction Method for Tropospheric Scintillation on Earth-Space Paths," *IEEE Transactions on Antennas and Propagation*, IEEE Antennas and Propagation Society, vol. 36, No. 11, pp. 1608-1614 (Nov. 1988).

Kirsten, J. and Fleming, J., "Undersampling reduces data-acquisition costs for select applications," *EDN*, Cahners Publishing, vol. 35, No. 13, pp. 217-222, 224, 226-228 (Jun. 21, 1990).

Lam, W.K. et al., "Measurement of the Phase Noise Characteristics of an Unlocked Communications Channel Identifier," *Proceedings Of the 1993 IEEE International Frequency Control Symposium*, IEEE, pp. 283-288 (Jun. 2-4, 1993).

Lam, W.K. et al., "Wideband sounding of 11.6 Ghz transhorizon channel," *Electronics Letters*, IEE, vol. 30, No. 9, pp. 738-739 (Apr. 28, 1994).

Larkin, K.G., "Efficient demodulator for bandpass sampled AM signals," *Electronics Letters*, IEE, vol. 32, No. 2, pp. 101-102 (Jan. 18, 1996).

Lau, W.H. et al., "Analysis of the Time Variant Structure of Microwave Line-of-sight Multipath Phenomena," *IEEE Global Telecommunications Conference & Exhibition*, IEEE, pp. 1707-1711 (Nov. 28 - Dec. 1, 1988).

Lau, W.H. et al., "Improved Prony Algorithm to Identify Multipath Components," *Electronics Letters*, IEE, vol. 23, No. 20, pp. 1059-1060 (Sep. 24, 1987).

Lesage, P. and Audoin, C., "Effect of Dead-Time on the Estimation of the Two-Sample Variance," *IEEE Transactions on Instrumentation and Measurement*, IEEE Instrumentation and Measurement Society, vol. IM-28, No. 1, pp. 6-10 (Mar. 1979).
Liechti, C.A., "Performance of Dual-gate GaAs MESFET's as Gain-Controlled Low-Noise Amplifiers and High-Speed Modulators," *IEEE Transactions on Microwave Theory and Techniques*, IEEE Microwave Theory and Techniques Society, vol. MTT-23, No. 6, pp. 461-469 (Jun. 1975).
Linnenbrink, T.E. et al., "A One Gigasample Per Second Transient Recorder," *IEEE Transactions on Nuclear Science*, IEEE Nuclear and Plasma Sciences Society, vol. NS-26, No. 4, pp. 4443-4449 (Aug. 1979).
Liou, M.L., "A Tutorial on Computer-Aided Analysis of Switched-Capacitor Circuits," *Proceedings of the IEEE*, IEEE, vol. 71, No. 8, pp. 987-1005 (Aug. 1983).
Lo, P. et al., "Coherent Automatic Gain Control," *IEE Colloquium on Phase Locked Techniques*, IEE, pp. 2/1-2/6 (Mar. 26, 1980).
Lo, P. et al., "Computation of Rain Induced Scintillations on Satellite Down-Links at Microwave Frequencies," *Third International Conference on Antennas and Propagation* (*ICAP 83*), pp. 127-131 (Apr. 12-15, 1983).
Lo, P.S.L.O. et al., "Observations of Amplitude Scintillations on a Low-Elevation Earth-Space Path," *Electronics Letters*, IEE, vol. 20, No. 7, pp. 307-308 (Mar. 29, 1984).
Madani, K. and Aithison, C.S., "A 20 Ghz Microwave Sampler," *IEEE Transactions on Microwave Theory and Techniques*, IEEE Microwave Theory and Techniques Society, vol. 40, No. 10, pp. 1960-1963 (Oct. 1992).
Marsland, R.A. et al., "130 Ghz GaAs monolithic integrated circuit sampling head," *Appl. Phys. Lett.*, American Institute of Physics, vol. 55, No. 6, pp. 592-594 (Aug. 7, 1989).
Martin, K. and Sedra, A.S., "Switched-Capacitor Building Blocks for Adaptive Systems," *IEEE Transactions on Circuits and Systems*, IEEE Circuits and Systems Society, vol. CAS-28, No. 6, pp. 576-584 (Jun. 1981).
Marzano, F.S. and d'Auria, G., "Model-based Prediction of Amplitude Scintillation variance due to Clear-Air Tropospheric Turbulence on Earth-Satellite Microwave Links," *IEEE Transactions on Antennas and Propagation*, IEEE Antennas and Propagation Society, vol. 46, No. 10, pp. 1506-1518 (Oct. 1998).
Matricciani, E., "Prediction of fade durations due to rain in satellite communication systems," *Radio Science*, American Geophysical Union, vol. 32, No. 3, pp. 935-941 (May-Jun. 1997).
McQueen, J.G., "The Monitoring of High-Speed Waveforms," *Electronic Engineering*, Morgan Brothers Limited, vol. XXIV, No. 296, pp. 436-441 (Oct. 1952).
Merkelo, J. and Hall, R.D., "Broad-Band Thin-Film Signal Sampler," *IEEE Journal of Solid-State Circuits*, IEEE, vol. SC-7, No. 1, pp. 50-54 (Feb. 1972).
Merlo, U. et al., "Amplitude Scintillation Cycles in a Sirio Satellite-Earth Link," *Electronics Letters*, IEE, vol. 21, No. 23, pp. 1094-1096 (Nov. 7, 1985).
Morris, D., "Radio-holographic reflector measurement of the 30-m millimeter radio telescope at 22 Ghz with a cosmic signal source," *Astronomy and Astrophysics*, Springer-Verlag, vol. 203, No. 2, pp. 399-406 (Sep. (II) 1988).
Moulsley, T.J. et al., "The efficient acquisition and processing of propagation statistics," *Journal of the Institution of Electronic and Radio Engineers*, IERE, vol. 55, No. 3, pp. 97-103 (Mar. 1985).
Ndzi, D. et al., "Wide-Band Statistical Characterization of an Over-the-Sea Experimental Transhorizon Link," *IEE Colloquium on Radio Communications at Microwave and Millimetre Wave Frequencies*, IEE, pp. 1/1-1/6 (Dec. 16, 1996).
Ndzi, D. et al., "Wideband Statistics of Signal Levels and Doppler Spread on an Over-The-Sea Transhorizon Link," *IEE Colloquium on Propagation Characteristics and Related System Techniques for Beyond Line-of-Sight Radio*, IEE, pp. 9/1-9/6 (Nov. 24, 1997).
"New zero IF chipset from Philips," *Electronic Engineering*, United News & Media, vol. 67, No. 825, p. 10 (Sep. 1995).
Ohara, H. et al., "First monolithic PCM filter cuts cost of telecomm systems," *Electronic Design*, Hayden Publishing Company, vol. 27, No. 8, pp. 130-135 (Apr. 12, 1979).
Oppenheim, A.V. et al., *Signals and Systems*, Prentice-Hall, pp. 527-531 and 561-562 (1983).
Ortgies, G., "Experimental Parameters Affecting Amplitude Scintillation Measurements on Satellite Links," *Electronics Letters*, IEE, vol. 21, No. 17, pp. 771-772 (Aug. 15, 1985).
Pārssinen et al., "A 2-GHz Subharmonic Sampler for Signal Downconversion," *IEEE Transactions on Microwave Theory and Techniques*, IEEE, vol. 45, No. 12, 7 pages (Dec. 1997).
Peeters, G. et al., "Evaluation of Statistical Models for Clear-Air Scintillation Prediction Using Olympus Satellite Measurements," *International Journal of Satellite Communications*, John Wiley and Sons, vol. 15, No. 2, pp. 73-88 (Mar.-Apr. 1997).
Perrey, A.G. and Schoenwetter, H.K., *NBS Technical Note 1121: A Schottky Diode Bridge Sampling Gate*, U.S. Dept. of Commerce, pp. 1-14 (May 1980).
Poulton, K. et al., "A 1-Ghz 6-bit ADC System," *IEEE Journal of Solid-State Circuits*, IEEE, vol. SC-22, No. 6, pp. 962-969 (Dec. 1987).
Press Release, "Parkervision, Inc. Announces Fiscal 1993 Results," Lippert/Heilshorn and Associates, 2 pages (Apr. 6, 1994).
Press Release, "Parkervision, Inc. Announces the Appointment of Michael Baker to the New Position of National Sales Manager," Lippert/Heilshorn and Associates, 1 Page (Apr. 7, 1994).
Press Release, "Parkervision's Cameraman Well-Received By Distance Learning Market," Lippert/Heilshorn and Associates, 2 Pages (Apr. 8, 1994).
Press Release, "Parkervision, Inc. Announces First Quarter Financial Results," Lippert/Heilshorn and Associates, 2 Pages (Apr. 26, 1994).
Press Release, "Parkervision, Inc. Announces The Retirement of William H. Fletcher, Chief Financial Officer," Lippert/Heilshorn and Associates, 1 Page (May 11, 1994).
Press Release, "Parkervision, Inc. Announces New Cameraman System II™ At Infocomm Trade Show," Lippert/Heilshorn and Associates, 3 Pages (Jun. 9, 1994).
Press Release, "Parkervision, Inc. Announces Appointments to its National Sales Force," Lippert/Heilshorn and Associates, 2 Pages (Jun. 17, 1994).
Press Release, "Parkervision, Inc. Announces Second Quarter and Six Months Financial Results," Lippert/Heilshorn and Associates, 3 Pages (Aug. 9, 1994).
Press Release, "Parkervision, Inc. Announces Third Quarter and Nine Months Financial Results," Lippert/Heilshorn and Associates, 3 Pages (Oct. 28, 1994).
Press Release, "Parkervision, Inc. Announces First Significant Dealer Sale of Its *Cameraman*® System II," Lippert/Heilshorn and Associates, 2 Pages (Nov. 7, 1994).

Press Release, "Parkervision, Inc. Announces Fourth Quarter and Year End Results," Lippert/Heilshorn and Associates, 2 Pages (Mar. 1, 1995).
Press Release, "Parkervision, Inc. Announces Joint Product Developments With VTEL," Lippert/Heilshorn and Associates, 2 Pages (Mar. 21, 1995).
Press Release, "Parkervision, Inc. Announces First Quarter Financial Results," Lippert/Heilshorn and Associates, 3 Pages (Apr. 28, 1995).
Press Release, "Parkervision Wins Top 100 Product Districts' Choice Award," Parkervision Marketing and Manufacturing Headquarters, 1 Page (Jun. 29, 1995).
Press Release, "Parkervision National Sales Manager Next President of USDLA," Parkervision Marketing and Manufacturing Headquarters, 1 Page (Jul. 6, 1995).
Press Release, "Parkervision Granted New Patent," Parkervision Marketing and Manufacturing Headquarters, 1 Page (Jul. 21, 1995).
Press Release, "Parkervision, Inc. Announces Second Quarter and Six Months Financial Results," Parkervision Marketing and Manufacturing Headquarters, 2 Pages (Jul. 31, 1995).
Press Release, "Parkervision, Inc. Expands Its Cameraman System II Product Line," Parkervision Marketing and Manufacturing Headquarters, 2 Pages (Sep. 22, 1995).
Press Release, "Parkervision Announces New Camera Control Technology," Parkervision Marketing and Manufacturing Headquarters, 2 Pages (Oct. 25, 1995).
Press Release, "Parkervision, Inc. Announces Completion of VTEL/Parkervision Joint Product Line," Parkervision Marketing and Manufacturing Headquarters, 2 Pages (Oct. 30, 1995).
Press Release, "Parkervision, Inc. Announces Third Quarter and Nine Months Financial Results," Parkervision Marketing and Manufacturing Headquarters, 2 Pages (Oct. 30, 1995).
Press Release, "Parkervision's Cameraman Personal Locator Camera System Wins Telecon XV Award," Parkervision Marketing and Manufacturing Headquarters, 2 Pages (Nov. 1, 1995).
Press Release, "Parkervision, Inc. Announces Purchase Commitment From VTEL Corporation," Parkervision Marketing and Manufacturing Headquarters, 1 Page (Feb. 26, 1996).
Press Release, "ParkerVision, Inc. Announces Fourth Quarter and Year End Results," Parkervision Marketing and Manufacturing Headquarters, 2 Pages (Feb. 27, 1996).
Press Release, "ParkerVision, Inc. Expands its Product Line, " Parkervision Marketing and Manufacturing Headquarters, 2 Pages (Mar. 7, 1996).
Press Release, "ParkerVision Files Patents for its Research of Wireless Technology," Parkervision Marketing and Manufacturing Headquarters, 1 Page (Mar. 28, 1996).
Press Release, "Parkervision, Inc. Announces First Significant Sale of Its Cameraman® Three-Chip System," Parkervision Marketing and Manufacturing Headquarters, 2 pages (Apr. 12, 1996).
Press Release, "Parkervision, Inc. Introduces New Product Line For Studio Production Market," Parkervision Marketing and Manufacturing Headquarters, 2 Pages (Apr. 15, 1996).
Press Release, "Parkervision, Inc. Announces Private Placement of 800,000 Shares," Parkervision Marketing and Manufacturing Headquarters, 1 Page (Apr. 15, 1996).
Press Release, "Parkervision, Inc. Announces First Quarter Financial Results," Parkervision Marketing and Manufacturing Headquarters, 3 Pages (Apr. 30, 1996).
Press Release, "ParkerVision's New Studio Product Wins Award," Parkervision Marketing and Manufacturing Headquarters, 2 Pages (Jun. 5, 1996).
Press Release, "Parkervision, Inc. Announces Second Quarter and Six Months Financial Results," Parkervision Marketing and Manufacturing Headquarters, 3 Pages (Aug. 1, 1996).
Press Release, "Parkervision, Inc. Announces Third Quarter and Nine Months Financial Results," Parkervision Marketing and Manufacturing Headquarters, 2 Pages (Oct. 29, 1996).
Press Release, "PictureTel and ParkerVision Sign Reseller Agreement," Parkervision Marketing and Manufacturing Headquarters, 2 Pages (Oct. 30, 1996).
Press Release, "CLI and ParkerVision Bring Enhanced Ease-of-Use to Videoconferencing," CLI/Parkervision, 2 Pages (Jan. 20, 1997).
Press Release, "Parkervision, Inc. Announces Fourth Quarter and Year End Results," Parkervision Marketing and Manufacturing Headquarters, 3 Pages (Feb. 27, 1997).
Press Release, "Parkervision, Inc. Announces First Quarter Financial Results," Parkervision Marketing and Manufacturing Headquarters, 3 Pages (Apr. 29, 1997).
Press Release, "NEC and Parkervision Make Distance Learning Closer," NEC America, 2 Pages (Jun. 18, 1997).
Press Release, "Parkervision Supplies JPL with Robotic Cameras, Cameraman Shot Director for Mars Mission," Parkervision Marketing and Manufacturing Headquarters, 2 pages (Jul. 8, 1997).
Press Release, "ParkerVision and IBM Join Forces to Create Wireless Computer Peripherals," Parkervision Marketing and Manufacturing Headquarters, 2 Pages (Jul. 23, 1997).
Press Release, "ParkerVision, Inc. Announces Second Quarter and Six Months Financial Results," Parkervision Marketing and Manufacturing Headquarters, 3 Pages (Jul. 31, 1997).
Press Release, "Parkervision, Inc. Announces Private Placement of 990,000 Shares," Parkervision Marketing and Manufacturing Headquarters, 2 Pages (Sep. 8, 1997).
Press Release, "Wal-Mart Chooses Parkervision for Broadcast Production," Parkervision Marketing and Manufacturing Headquarters, 2 Pages (Oct. 24, 1997).
Press Release, "Parkervision, Inc. Announces Third Quarter Financial Results," Parkervision Marketing and Manufacturing Headquarters, 3 Pages (Oct. 30, 1997).
Press Release, "ParkerVision Announces Breakthrough in Wireless Radio Frequency Technology," Parkervision Marketing and Manufacturing Headquarters, 3 Pages (Dec. 10, 1997).
Press Release, "Parkervision, Inc. Announces the Appointment of Joseph F. Skovron to the Position of Vice President, Licensing—Wireless Technologies," Parkervision Marketing and Manufacturing Headquarters, 2 Pages (Jan. 9, 1998).
Press Release, "Parkervision Announces Existing Agreement with IBM Terminates—Company Continues with Strategic Focus Announced in December," Parkervision Marketing and Manufacturing Headquarters, 2 Pages (Jan. 27, 1998).
Press Release, "Laboratory Tests Verify Parkervision Wireless Technology," Parkervision Marketing and Manufacturing Headquarters, 2 Pages (Mar. 3, 1998).

Press Release, "Parkervision, Inc. Announces Fourth Quarter and Year End Financial Results," Parkervision Marketing and Manufacturing Headquarters, 3 Pages (Mar. 5, 1998).
Press Release, "Parkervision Awarded Editor's Pick of Show for NAB 98," Parkervision Marketing and Manufacturing Headquarters, 2 Pages (Apr. 15, 1998).
Press Release, "Parkervision Announces First Quarter Financial Results," Parkervision Marketing and Manufacturing Headquarters, 3 Pages (May 4, 1998).
Press Release, "Parkervision 'DIRECT2DATA' Introduced in Response to Market Demand," Parkervision Marketing and Manufacturing Headquarters, 3 Pages (Jul. 9, 1998).
Press Release, "Parkervision Expands Senior Management Team," Parkervision Marketing and Manufacturing Headquarters, 2 Pages (Jul. 29, 1998).
Press Release, "Parkervision Announces Second Quarter and Six Month Financial Results," Parkervision Marketing and Manufacturing Headquarters, 4 Pages (Jul. 30, 1998).
Press Release, "Parkervision Announces Third Quarter and Nine Month Financial Results," Parkervision Marketing and Manufacturing Headquarters, 3 Pages (Oct. 30, 1998).
Press Release, "Questar Infocomm, Inc. Invests $5 Million in Parkervision Common Stock," Parkervision Marketing and Manufacturing Headquarters, 3 Pages (Dec. 2, 1998).
Press Release, "Parkervision Adds Two New Directors," Parkervision Marketing and Manufacturing Headquarters, 2 Pages (Mar. 5, 1999).
Press Release, "Parkervision Announces Fourth Quarter and Year End Financial Results," Parkervision Marketing and Manufacturing Headquarters, 3 Pages (Mar. 5, 1999).
Press Release, "Joint Marketing Agreement Offers New Automated Production Solution," Parkervision Marketing and Manufacturing Headquarters, 2 Pages (Apr. 13, 1999).
"Project COST 205: Scintillations in Earth-satellite links," *Alta Frequenza: Scientific Review in Electronics*, AEI, vol. LIV, No. 3, pp. 209-211 (May-Jun., 1985).
Razavi, B., *RF Microelectronics*, Prentice-Hall, pp. 147-149 (1998).
Reeves, R.J.D., "The Recording and Collocation of Waveforms (Part 1)," *Electronic Engineering*, Morgan Brothers Limited, vol. 31, No. 373, pp. 130-137 (Mar. 1959).
Reeves, R.J.D., "The Recording and Collocation of Waveforms (Part 2)," *Electronic Engineering*, Morgan Brothers Limited, vol. 31, No. 374, pp. 204-212 (Apr. 1959).
Rein, H.M. and Zahn, M., "Subnanosecond-Pulse Generator with Variable Pulsewidth Using Avalanche Transistors," *Electronics Letters*, IEE, vol. 11, No. 1, pp. 21-23 (Jan. 9, 1975).
Riad, S.M. and Nahman, N.S., "Modeling of the Feed-through Wideband (DC to 12.4 Ghz) Sampling-Head," *IEEE MTT-S International Microwave Symposium Digest*, IEEE, pp. 267-269 (Jun. 27-29, 1978).
Rizzoli, V. et al., "Computer-Aided Noise Analysis of MESFET and HEMT Mixers," *IEEE Transactions on Microwave Theory and Techniques*, IEEE, vol. 37, No. 9, pp. 1401-1410 (Sep. 1989).
Rowe, H.E., *Signals and Noise in Communication System*, D. Van Nostrand Company, Inc., Princeton, New Jersey, including, for example, Chapter V, Pulse Modulation Systems (1965).
Rücker, F. and Dintelmann, F., "Effect of Antenna Size on OTS Signal Scintillations and Their Seasonal Dependence," *Electronics Letters*, IEE, vol. 19, No. 24, pp. 1032-1034 (Nov. 24, 1983).
Russell, R. and Hoare, L., "Millimeter Wave Phase Locked Oscillators," *Military Microwaves '78 Conference Proceedings*, Microwave Exhibitions and Publishers, pp. 238-242 (Oct. 25-27, 1978).
Sabel, L.P., "A DSP Implementation of a Robust Flexible Receiver/Demultiplexer for Broadcast Data Satellite Communications," *The Institution of Engineers Australia Communications Conference*, Institution of Engineers, Australia, pp. 218-223 (Oct. 16-18, 1990).
Salous, S., "IF digital generation of FMCW waveforms for wideband channel characterization," *IEE Proceedings-I*, IEE, vol. 139, No. 3, pp. 281-288 (Jun. 1992).
"Sampling Loops Lock Sources to 23 Ghz," *Microwaves & RF*, Penton Publishing, p. 212 (Sep. 1990).
Sasikumar, M. et al., "Active Compensation in the Switched-Capacitor Biquad," *Proceedings of the IEEE*, IEEE, vol. 71, No. 8, pp. 1008-1009 (Aug. 1983).
Saul, P.H., "A GaAs MESFET Sample and Hold Switch," *Fifth European Solid State Circuits Conference-ESSCIRC 79*, IEE, pp. 5-7 (1979).
Shen, D.H. et al., "A 900-MHZ RF Front-End with Integrated Discrete-Time Filtering," *IEEE Journal of Solid-State Circuits*, IEEE Solid-State Circuits Council, vol. 31, No. 12, pp. 1945-1954 (Dec. 1996).
Shen, X.D. and Vilar, E., "Anomalous transhorizon propagation and meteorological processes of a multilink path," *Radio Science*, American Geophysical Union, vol. 30, No. 5, pp. 1467-1479 (Sep.-Oct. 1995).
Shen, X. and Tawfik, A.N., "Dynamic Behaviour of Radio Channels Due to Trans-Horizon Propagation Mechanisms," *Electronics Letters*, IEE, vol. 29, No. 17, pp. 1582-1583 (Aug. 19, 1993).
Shen, X. et al., "Modeling Enhanced Spherical Diffraction and Troposcattering on a Transhorizon Path with aid of the parabolic Equation and Ray Tracing Methods," *IEE Colloquium on Common modeling techniques for electromagnetic wave and acoustic wave propagation*, IEE, pp. 4/1-4/7 (Mar. 8, 1996).
Shen, X. and Vilar, E., "Path loss statistics and mechanisms of transhorizon propagation over a sea path," *Electronics Letters*, IEE, vol. 32, No. 3, pp. 259-261 (Feb. 1, 1996).
Shen, D. et al., "A 900 MHZ Integrated Discrete-Time Filtering RF Front-End," *IEEE International Solid State Circuits Conference*, IEEE, vol. 39, pp. 54-55 and 417 (Feb. 1996).
Spillard, C. et al., "X-Band Tropospheric Transhorizon Propagation Under Differing Meteorological Conditions," *Sixth International Conference on Antennas and Propagation (ICAP 89) Part 2: Propagation*, IEE, pp. 451-455 (Apr. 4-7, 1989).
Stafford, K.R. et al., "A Complete Monolithic Sample/Hold Amplifier," *IEEE Journal of Solid-State Circuits*, IEEE, vol. SC-9, No. 6, pp. 381-387 (Dec. 1974).
Staruk, W. Jr. et al., "Pushing HF Data Rates," *Defense Electronics*, EW Communications, vol. 17, No. 5, pp. 211, 213, 215, 217, 220 and 222 (May 1985).
Stephenson, A.G., "Digitizing multiple RF signals requires an optimum sampling rate," *Electronics*, McGraw-Hill, pp. 106-110 (Mar. 27, 1972).
Sugarman, R., "Sampling Oscilloscope for Statistically Varying Pulses," *The Review of Scientific Instruments*, American Institute of Physics, vol. 28, No. 11, pp. 933-938 (Nov. 1957).

Sylvain, M., "Experimental probing of multipath microwave channels," *Radio Science*, American Geophysical Union, vol. 24, No. 2, pp. 160-178 (Mar.-Apr. 1989).
Takano, T., "NOVEL GaAs Pet Phase Detector Operable To Ka Band," *IEEE MT-S Digest*, IEEE, pp. 381-383 (1984).
Tan, M.A., "Biquadratic Transconductance Switched-Capacitor Filters," *IEEE Transactions on Circuits and Systems- I: Fundamental Theory and Applications*, IEEE Circuits and Systems Society, vol. 40, No. 4, pp. 272-275 (Apr. 1993).
Tanaka, K. et al., "Single Chip Multisystem AM Stereo Decoder IC," *IEEE Transactions on Consumer Electronics*, IEEE Consumer Electronics Society, vol. CE-32, No. 3, pp. 482-496 (Aug. 1986).
Tawfik, A.N., "Amplitude, Duration and Predictability of Long Hop Trans-Horizon X-band Signals Over the Sea," *Electronics Letters*, IEE, vol. 28, No. 6, pp. 571-572 (Mar. 12, 1992).
Tawfik, A.N. and Vilar, E., "Correlation of Transhorizon Signal Level Strength with Localized Surface Meteorological Parameters," *Eighth International Conference on Antennas and Propagation*, Electronics Division of the IEE, pp. 335-339 (Mar. 30-Apr. 2, 1993).
Tawfik, A.N. and Vilar, E., "Dynamic Structure of a Transhorizon Signal at X-band Over a Sea Path," *Sixth International Conference on Antennas and Propagation (ICAP 89) Part 2: Propagation*, IEE, pp. 446-450 (Apr. 4-7, 1989).
Tawfik, A.N. and Vilar, E., "Statistics of Duration and Intensity of Path Loss in a Microwave Transhorizon Sea-Path," *Electronics Letters*, IEE, vol. 26, No. 7, pp. 474-476 (Mar. 29, 1990).
Tawfik, A.N. and Vilar, E., "X-Band Transhorizon Measurements of CW Transmissions Over the Sea- Part 1: Path Loss, Duration of Events, and Their Modeling," *IEEE Transactions on Antennas and Propagation*, IEEE Antennas and Propagation Society, vol. 41, No. 11, pp. 1491-1500 (Nov. 1993).
Temes, G.C. and Tsividis, T., "The Special Section on Switched-Capacitor Circuits," *Proceedings of the IEEE*, IEEE, vol. 71, No. 8, pp. 915-916 (Aug. 1983).
Thomas, G.B., *Calculus and Analytic Geometry*, Third Edition, Addision-Wesley Publishing, pp. 119-133 (1960).
Tomassetti, Q., "An Unusual Microwave Mixer," 16th European Microwave Conference, Microwave Exhibitions and Publishers, pp. 754-759 (Sep. 8-12, 1986).
Tortoli, P. et al., "Bidirectional Doppler Signal Analysis Based on a Single RF Sampling Channel," *IEEE Transations on Ultrasonics, Ferroelectrics, and Frequency Control*, IEEE Ultrasonics, Ferroelectrics, and Frequency Control Society, vol. 41, No. 1, pp.1-3 (Jan. 1984).
Tsividis, Y. Antognetti, P. (Ed.), Design of MOS VLSI Circuits for Telecommunications, Prentice-Hall, p. 304 (1985).
Tsividis, Y., "Principles of Operation and Analysis of Switched-Capacitor Circuits," Proceedinds of the IEEE, IEEE, vol. 71, No. 8, pp. 926-940 (Aug. 1983).
Tsurumi, H. and Maeda, T., "Design on a Direct Conversion Receiver Front-End for 280 MHZ, 900 MHZ, and 2.6 Ghz Band Radio Communication Systems," *41st IEEE Vehicular Technology Conference*, IEEE Vehicular Technology Society, pp. 457-462 (May 19-22, 1991).
Valdmanis, J.A. et al., "Picosecond and Subpicosend Optoelectronics for Measurements of Future High Speed Electronic Devices," *IEDM Technical Digest*, IEEE, pp. 597-600 (Dec. 5-7, 1983).
van de Kamp, M.M.J.L., "Asymmetric signal level distribution due to tropospheric scintillation," *Electronics Letters*, IEE, vol. 34, No. 11, pp. 1145-1146 (May 28, 1998).
Vasseur, H. and Vanhoenacker, D., "Characterization of tropospheric turbulent layers from radiosonde data," *Electronics Letters*, IEE, vol. 34, No. 4, pp. 318-319 (Feb. 19, 1998).
Verdone, R., "Outrage Probability Analysis for Short-Range Communications Systems at 60 Ghz in ATT Urban Environments," *IEEE Transactions on Vehicular Technology*, IEEE Vehicular Technology Society, vol. 46, No. 4, pp. 1027-1039 (Nov. 1997).
Vierira-Ribeiro, S.A., *Single-IF DECT Receiver Architecture using a Quadrature Sub-Sampling Band-Pass Sigma-Delta Modulator*, Thesis for Degree of Master's of Engineering, Carleton University, UMI Dissertation Services, pp. 1-180 (Apr. 1995).
Vilar, E. et al., "A Comprehensive/Selective MM-Wave Satellite Downlink Experiment on Fade Dynamics," *Tenth International Conference on Antennas and Propagation*, Electronic Division of the IEE, pp. 2.98-2.101 (Apr. 14-17, 1997).
Vilar, E., et al., "A System to Measure LOS Atmosphere Transmittance at 19 Ghz," *AGARD Conference Proceedings No. 346: Characteristics of the Lower Atmosphere Influencing Radio Wave Propagation*, AGARD, pp. 8-1-8-16 (Oct. 4-7, 1983).
Vilar, E. and Smith, H., "A Theoretical and Experimental Study of Angular Scintillations in Earth Space Paths," *IEEE Tranactions on Antennas and Propagation*, IEEE, vol. AP-34, No. 1, pp. 2-10 (Jan. 1986).
Vilar, E. et al., "A Wide Band Transhorizon Experiment at 11.6 Ghz," *Eighth International Conference on Antennas and Propagation*, Electronics Divison of the IEE, pp. 441-445 (Mar. 30-Apr. 2, 1993).
Vilar, E. and Matthews, P.A., "Amplitude Dependance of Frequency in Oscillators," *Electronics Letters*, IEE, vol. 8, No. 20, pp. 509-511 (Oct. 5, 1972).
Vilar, E. et al., "An experimental mm-wave receiver system for measuring phase noise due to atmospheric turbulence," *Proceedings of the 25th European Microwave Conference*, Nexus House, pp. 114-119 (1995).
Vilar, E. and Burgueño, A., "Analysis and Modeling of Time Intervals Between Rain Rate Exceedances in the Context of Fade Dynamics," *IEEE Tranactions on Communications*, IEEE Communications, IEEE Communications Society, vol. 39, No. 9, pp. 1306-1312 (Sep. 1991).
Vilar, E. et al., "Angle of Arrival Fluctuations in High and Low Elevation Earth Space Paths," *Fourth International Conference on Antennas and Propagation* (*ICAP 85*), Electronics Division of the IEE, pp. 83-88 (Apr. 16-19, 1985).
Vilar, E., "Antennas and Propagation: A Telecommunications System Subject," *Electronics Divison Colloquium on Teaching Antennas and Propagation to Undergraduates*, IEE, pp. 7/1-7/6 (Mar. 8, 1988).
Vilar, E. et al., "CERS*. Millimetre-Wave Beacon Package and Related Payload Doppler Correction Strategies," *Electronics Division Colloquium on CERS- Communications Engineering Research Satellite*, IEE, pp. 10/1-10/10 (Apr. 10, 1984).
Vilar, E. and Moulsley, T.J., "Comment and Reply: Probability Density Function of Amplitude Scintillations,"

*Electronics Letters*, IEE, vol. 21, No. 14, pp. 620-622 (Jul. 4, 1985).
Vilar, E. et al., "Comparison of Rainfall Rate Duration Distributions for ILE-IFE and Barcelona," *Electronics Letters*, IEE, vol. 28, No. 20, pp. 1922-1924 (Sep. 24, 1992).
Vilar, E., "Depolarization and Field Transmittances in Indoor Communications," *Electronics Letters*, IEE, vol. 27, No. 9, pp. 732-733 (Apr. 25, 1991).
Vilar, E. and Larsen, J.R., "Elevation Dependence of Amplitude Scintillations on Low Elevation Earth Space Paths," *Sixth International Conference on Antennas and Propagation* (*ICAP 89*) *Part 2:* Propagation, IEE, pp. 150-154 (Apr. 4-7, 1989).
Vilar, E. et al., "Experimental System and Measurements of Transhorizon Signals Levels at 11 Ghz," *18th European Microwave Conference*, Microwave Exhibitions and Publishers Ltd., pp. 429-435 (Sep. 12-15, 1988).
Vilar, E. and Matthews, P.A., "Importance of Amplitude Scintillations in Millimetric Radio Links," *Proceedings of the 4th European Microwave Conference*, Microwave Exhibitions and Publishers, pp. 202-206 (Sep. 10-13, 1974).
Vilar, E. and Haddon, J., "Measurement and Modeling of Scintillation Intensity to Estimate Turbulence Parameters in an Earth-Space Path," *IEEE Transactions on Antennas and Propagation*, IEEE Antennas and Propagation Society, vol. AP-32, No. 4, pp. 340-346 (Apr. 1984).
Vilar, E. and Matthews, P.A., "Measurement of Phase Fluctuations on Millimetric Radiowave Propagation," *Electronics Letters*, IEE, vol. 7, No. 18, pp. 566-568 (Sep. 9, 1971).
Vilar, E. and Wan, K.W., "Narrow and Wide Band Estimates of Field Strength for Indoor Communications in the Millimetre Band," *Electronics Division Colloquium on Radiocommunications in the Range 30-60 Ghz*, IEE, pp. 5/1-5/8 (Jan. 17, 1991).
Vilar, E. and Faulkner, N.D., "Phase Noise and Frequency Stability Measurements. Numerial Techniques and Limitations," *Electronics Division Colloquium on Low Noise Oscillators and Synthesizer*, IEE, 5 pages (Jan. 23, 1986).
Vilar, E. and Senin, S., "Propagation phase noise identified using 40 Ghz satellite downlink," *Electronics Letters*, IEE, vol. 33, No. 22, pp. 1901-1902 (Oct. 23, 1997).
Vilar, E. et al., "Scattering and Extinction: Dependence Upon Raindrop Size Distribution in Temperate (Barcelona) and Tropical (Belem) Regions," *Tenth International Conference on Antennas and Propagation*, Electronics Division of the IEE, pp. 2.230-2.233 (Apr. 14-17, 1997).
Vilar, E. and Haddon, J., "Scintillation Modeling and Measurement—A Tool for Remote-Sensing Slant Paths," *AGARD Conference Proceedings No. 332: Propagation Aspects of Frequency Sharing, Interference And System Diversity*, AGARD, pp. 27-1-27-13 (Oct. 18-22, 1982).
Vilar, E., "Some Limitations on Digital Transmission Through Turbulent Atmosphere," *International Conference on Satellite Communication Systems Technology*, Electronics Division of the IEE, pp. 169-187 (Apr. 7-10, 1975).
Vilar, E. and Matthews, P.A., "Summary of Scintillation Observations in a 36 Ghz Link Across London," *International Conference on Antennas and Propagation Part 2: Propagation*, IEE, pp. 36-40 (Nov. 28-30, 1978).
Vilar, E. et al., "Wideband Characterization of Scattering Channels," *Tenth International Conference on Antennas and Propagation*, Electronics Division of the IEE, pp. 2.353-2.358 (Apr. 14-17, 1997).
Vollmer, A., "Complete GPS Reciever Fits on Two Chips," *Electronic Design*, Penton Publishing, pp. 50, 52, 54 and 56 (Jul. 6, 1998).
*Voltage and Time Resolution in Digitizing Oscilloscopes: Application Note 348*, Hewlett Packard, pp. 1-11 (Nov. 1986).
Wan, K.W. et al., "A Novel Approach to the Simultaneous Measurement of Phase and Amplitude Noises in Oscillator," *Proceedings of the 19th European Microwave Conference*, Microwave Exhibitions and Publishers Ltd., pp. 809-813 (Sep. 4-7, 1989).
Wan, K.W. et al., "Extended Variances and Autoregressive/Moving Average Algorithm for the Measurement and Synthesis of Oscillator Phase Noise," *Proceedings Of the 43rd Annual Symposium on Frequency Control*, IEEE, pp. 331-335 (1989).
Wan, K.W. et al., "Wideband Transhorizon Channel Sounder at 11 Ghz," *Electronics Division Colloquium on High Bit Rate UHF/SHF Channel Sounders—Technology and Measurement*, IEE, pp. 3/1-3/5 (Dec. 3, 1993).
Wang, H., "A 1-V Multigigahertz RF Mixer Core in 0. 5—μm CMOS," *IEEE Journal of Solid-State Circuits*, IEEE Solid-State Circuits Society, vol. 33, No. 12, pp. 2265-2267 (Dec. 1998).
Watson, A.W.D. et al., "Digitial Conversion and Signal Processing for High Performance Communications Receivers," *Digitial Processing of Signals in Communications*, Institution of Electronic and Radio Engineers, pp. 367-373 (Apr. 22-26, 1985).
Weast, R.C. et al. (Ed.), *Handbook of Mathematical Tables*, Second Edition, The Chemical Rubber Co., pp. 480-485 (1964).
Wiley, R.G., "Approximate FM Demodulation Using Zero Crossings," *IEEE Transactions on Communications*, IEEE, vol. COM-29, No. 7, pp. 1061-1065 (Jul. 1981).
Worthman, W., "Convergence . . . Again," *RF Design*, Primedia, p. 102 (Mar. 1999).
Young I.A. and Hodges, D.A., "MOS Switched-Capacitor Analog Sampled-Data Direct-Form Recursive Filters," *IEEE Journal of Solid-State Circuits*, IEEE, vol. SC-14, No. 6, pp. 1020-1033 (Dec. 1979).
Translation of Specification and Claims of FR Patent No. 2245130, 3 pages.
Fest, Jean-Pierre, "Le Convertisseur A/N Revolutionne Le Recepteur Radio," *Electronique*, JMJ (Publisher), No. 54, pp. 40-42 (Dec. 1995).
Translation of DE Patent No. 35 41 031 A1, 22 pages.
Translation of EP Patent No. 0 732 803 A1, 9 pages.
Fest, Jean-Pierre, "The A/D Converter Revolutionizes the Radio Receiver," *Electronique*, JMJ (Publisher), No. 54 3 pages (Dec. 1995). (Translation of Doc. AQ50).
Translation of German Patent No. DE 197 35 798 C1, 8 pages.
Miki, S. and Nagahama, R., *Modulation System II*, Common Edition 7, Kyoritsu Publishing Co., Ltd., pp. 146-154 (Apr. 30, 1956).
Miki, S. and Nagahama, R., *Modulation System II*, Common Edition 7, Kyoritsu Publishing Co., Ltd., pp. 146-149 (Apr. 30, 1956). (Partial Translation of Doc. AQ51).
Rabiner, L.R. and Gold, B., *Theory And Application Of Digital Signal Processing*, Prentice-Hall, Inc., pp. xiii-xii and 40-46 (1975).
English-language Abstract of JP 08-032556, published Feb. 2, 1996, from http://www1.ipdl.jpo.go.jp, 2 Pages (last visited Dec. 14, 2001).

English-language Abstract of JP 08-139524, published May 31, 1996, from http://www1.ipdl.jpo.go.jp, 2 Pages (last visited Dec. 14, 2001).
English-language Abstract of JP 59-144249, published Aug. 18, 1984, from http://www1.ipdl.jpo.go.jp, 2 Pages (last visited Jan. 2, 2002).
English-language Abstract of JP 63-054002, published Mar. 8, 1988, from http://www1.ipdl.jpo.go.jp, 2 Pages (last visited Jan. 2, 2002).
English-language Abstract of JP 06-237276, published Aug. 23, 1994, from http://www1.ipdl.jpo.go.jp, 2 Pages (last visited Jan. 2, 2002).
English-language Abstract of JP 08-023359, published Jan. 23, 1996, from http://www1.ipdl.jpo.go.jp, 2 Pages (lset visited Jan. 2, 2002).
Partial Translation of Japanese Patent Publication No. 47-2314, 3 pages.
Partial Translation of Japanese Patent Publication No. 58-7903, 3 pages.
English-language Abstract of Japanese Patent Publication No. 58-133004, from http://www1.ipdl.jpo.go.jp, 2 Pages (Aug. 8, 1993—Date of publication of application).
English-language Abstract of Japanese Patent Publication No. 60-058705, from http://www1.ipdl.jpo.go.jp, 1 Page (Apr. 4, 1985—Date of publication of application).
English-language Abstract of Japanese Patent Publication No. 04-123614, from http://www1.ipdl.jpo.go.jp, 1 Page (Apr. 23, 1992—Date of publication of application).
English-language Abstract of Japanese Patent Publication No. 041-127601, from http://www1.ipdl.jpo.go.jp, 1 Page (Apr. 28, 1992—Date of publication of application).
English-language Abstract of Japanese Patent Publication No. 05-175730, from http://www1.ipdl.jpo.go.jp, 1 Page (Jul. 13, 1993—Date of publication of application).
English-language Abstract of Japanese Patent Publication No. 05-175734, from http://www1.ipdl.jpo.go.jp, 1 Page (Jul. 13, 1993—Date of pubication of application).
English-language Abstract of Japanese Patent Publication No. 07-154344, from http://www1.ipdl.jpo.go.jp, 2 Pages (Jun. 16, 1995—Date of publication of application).
Enlish-language Abstract of Japanese Patent Publication No. 07-307620, from http://www1.ipdl.jpo.go.jp, 1 Page (Nov. 21, 1995—Date of publication of application).
Oppenheim, A.V. and Schafer, R.W., *Digital Signal Processing*, Prentice-Hall, pp. vii-x, 6-35, 45-78, 87-121, and 136-165 (1975).
English-language Abstract of Japanese Patent Publication No. 55-066057, from http://www1.ipdl.jpo.go.jp, 1 Page (May 19, 1980—Date of publication of application).
English-language Abstract of Japanese Patent Publication No. 63-065587, from http://www1.ipdl.jpo.go.jp, 1 Page (Mar. 24, 1988—Date of publication of application).
Razavi, B., "A 900-MHz/1.8-GHz CMOS Transmitter for Dual-Band Applications," *Symposium on VLSI Circuits Digest of Technical Papers*, IEEE, pp. 128-131 (1998).
Ritter, G.M., "SDA, A New Solution for Transceivers," *16th European Microwave Conference*, Microwave Exhibitions and Publishers, pp. 729-733 (Sep. 8, 1986).
DIALOG File 351 (Derwent WPI) English Language Patent Abstract for FR 2 669 787, 1 page (May 29, 1992—Date of publication of application).
Akos, D.M. et al., "Direct Bandpass Sampling of Multiple Distinct RF Signals," *IEEE Transactions on Communications*, IEEE, vol. 47, No. 7, pp. 983-988 (Jul. 1999).
Patel, M. et al., "Bandpass Sampling for Software Radio Receivers, and the Effect of Oversampling on Aperture Jitter," *VTC 2002*, IEEE, pp. 1901-1905 (2002).
English-language Abstract of Japanese Patent Publication No. 61-030821, from http://www1.ipdl.jpo.go.jp, 1 Page (Feb. 13, 1986—Date of publication of application).
English-language Abstract of Japanese Patent Publication No. 05-327356, 1 from http://www1.ipdl.jpo.go.jp, 1 Page (Dec. 10, 1993—Date of publication of application).
Tayloe, D., "A Low-noise, High-performance Zero IF Quadrature Detector/Preamplifier," *RF Design*, Primedia Business Magazines & Media, Inc., pp. 58, 60, 62 and 69 (Mar. 2003).
Dines, J.A.B., "Smart Pixel Optoelectronic Receiver Based on a Charge Sensitive Amplifier Design," *IEEE Journal of Selected Topics in Quantum Electronics*, IEEE, vol. 2, No. 1, pp. 117-120 (Apr. 1996).
Simoni, A. et al., "A Digital Camera for Machine Vision," *20th International Conference on Industrial Electronics, Control and Instrumentation*, IEEE, pp. 879-883 (Sep. 1994).
Stewart, R.W. and Pfann, E., "Oversampling and sigma-delta strategies for data conversion," *Electronics & Communication Engineering Journal*, IEEE, pp. 37-47 (Feb. 1998).
Rudell, J.C. et al., "A 1.9GHz Wide-Band IF Double Conversion CMOS Receiver for Cordless Telephone Applications," *IEEE Journal of Solid-State Circuits*, IEEE, vol. 32, No. 12, pp. 2071-2088 (Dec. 1997).
English-language Abstract of Japanese Patent Publication No. 09-036664, from http://www1.ipdl.jpo.go.jp, 1 Page (Feb. 7, 1997—Date of publication of application).
English-language Abstract of Japanese Patent Publication No. 60-130203, from http://www1.ipdl.jpo.go.jp, 1 Page Jul. 11, 1985—Date of publication of application).
U.S. Appl. No. 09/476,091, filed Jan. 3, 2000, Sorrells et al.
U.S. Appl. No. 09/476,092, filed Jan. 3, 2000, Sorrells et al.
U.S. Appl. No. 09/476,330, filed Jan. 3, 2000, Sorrells et al.
U.S. Appl. No. 09/569,044, filed May 10, 2000, Sorrells et al.
U.S. Appl. No. 09/569,045, filed May 10, 2000, Sorrells et al.
Simoni, A. et al., "A Single-Chip Optical Sensor with Analog Memory for Motion Detection," *IEEE Journal of Solid-State Circtuits*, IEEE, vol. 30, No. 7, pp. 800-806 (Jul. 1995).
English Translation of German Patent Publication No. 196 48 915 A1, 10 pages.
Deboo, Gordon J., *Integrated Circuits and Semiconductor Devices*, 2nd Edition, McGraw-Hill, Inc., pp. 41-45 (1977).

* cited by examiner

ALIASING COMMUNICATION SYSTEM WITH MULTI-MODE AND MULTI-BAND FUNCTIONALITY AND EMBODIMENTS THEREOF, SUCH AS THE FAMILY RADIO SERVICE

CROSS-REFERENCE TO OTHER APPLICATIONS

This application claims the benefit of U.S. Provisional Application No. 60/116,847, filed Jan. 22, 1999, which is incorporated herein by reference in its entirety.

The following applications of common assignee are related to the present application, and are incorporated herein by reference in their entireties:

"Method and System for Down-Converting Electromagnetic Signals," Ser. No. 09/176,022, filed on Oct. 21, 1998.

"Method and System for Frequency Up-Conversion," Ser. No. 09/176,154, filed on Oct. 21, 1998.

"Method and System for Ensuring Reception of a Communications Signal," Ser. No. 09/176,415, filed on Oct. 21, 1998.

"Integrated Frequency Translation and Selectivity," Ser. No. 09/175,966, filed on Oct. 21, 1998.

"Image-Reject Down-Converter and Embodiments Thereof, Such as the Family Radio Service," Serial No. 09/476,091, filed Jan. 3, 2000.

"Analog Zero IF FM Decoder and Embodiments Thereof, Such as the Family Radio Service," Serial No. 09/476,092, filed Jan. 3, 2000.

"Multi-Mode, Multi-Band Communication System," Serial No. 09/476,330, filed Jan. 3, 2000.

BACKGROUND OF THE INVENTION

1. Field of the Invention

The present invention is generally directed toward receiver-transmitter systems referred to as Family Radio Service (FRS) units, although the invention is not limited to this embodiment. The Family Radio Service is one of the Citizens Band Radio Services. It is intended for the use of family, friends, and associates to communicate among themselves within a neighborhood or while on group outings. There are fourteen discreet FRS channels available for use on a "take turns" basis. The FRS unit channel frequencies are:

| Channel No. | (MHz) |
|---|---|
| 1 | 462.5625 |
| 2 | 462.5875 |
| 3 | 462.6125 |
| 4 | 462.6375 |
| 5 | 462.6625 |
| 6 | 462.6875 |
| 7 | 462.7125 |
| 8 | 467.5625 |
| 9 | 467.5875 |
| 10 | 467.6125 |
| 11 | 467.6375 |
| 12 | 467.6625 |
| 13 | 467.6875 |
| 14 | 467.7125 |

Other selected technical specifications are:

(a) Frequency modulation (although phase modulation is allowed);

(b) Frequency tolerance of each FRS unit must be maintained within 0.00025%;

(c) The authorized bandwidth for an FRS unit is 12.5 kHz; and (d) Effective radiated power (ERP) shall not, under any condition of modulation, exceed 0.500 W.

The operating rules for the FRS are found at 47 C.F.R. 95.191–95.194. For additional technical information, see 47 C.F.R. 95.601–95.669.

2. Related Art

A variety of Family Radio Service (FRS) transceivers are commercially available. Generally, operation of a conventional FRS transceiver is limited to a single FRS channel.

SUMMARY OF THE INVENTION

Briefly stated, the invention is directed to a receiver having multi-mode and multi-band functionality and capabilities. According to the invention, the receiver is capable of selectively operating over a plurality of bands and channels. The receiver operates in a plurality of modes, including but not limited to a single band/channel mode, and a multiple band/channel mode. The receiver may form a portion of a transceiver. The transceiver may also include a transmitter. In an embodiment, the transceiver is a family radio service (FRS) unit, although the invention is not limited to this embodiment.

Further features and advantages of the invention, as well as various embodiments of the invention, are described in detail below with reference to the accompanying drawings.

BRIEF DESCRIPTION OF THE FIGURES

The present invention will be described with reference to the accompanying drawings, wherein.

DETAILED DESCRIPTION OF THE PREFERRED EMBODIMENTS

Overview of the Invention

The invention is directed to a receiver having multi-mode and multi-band functionality and capabilities. According to the invention, the receiver is capable of selectively operating over a plurality of bands and channels. In an embodiment, the receiver operates in the following modes: (1) single band/channel mode; or (2) multiple band/channel mode.

In the single band/channel mode, the receiver is configured to receive information in a particular channel of a particular frequency band. The receiver may be dynamically reconfigured to listen to other channels and/or other bands.

In the multiple band/channel mode, the receiver is configured to receive information in one or more channels in one or more frequency bands. For example, and without limitation, the receiver could be configured to receive information from a plurality of channels of a single band, or one or more channels of a plurality of bands. A channel in a band that is being monitored (i.e., a channel in a band that the receiver is listening to) is herein referred to as a channel/band combination.

The receiver preferably listens to each channel/band combination for a finite period of time. After the time period of a given channel/band combination expires, the receiver listens to another channel/band combination for a limited amount of time.

In an embodiment, the receiver listens to the channel/band combinations in a round robin manner. The receiver listens to each channel/band combination for the same time duration. In other embodiments, the receiver listens to the channel/band combinations in other orders. For example, a user may specify the order in which the channel/band combinations are listened to by the receiver. The user may specify that some channel/band combinations are listened to more often than others. The user may specify that some channel/band combinations are listened to for durations different than the durations associated with other channel/band combinations.

Figure 6:
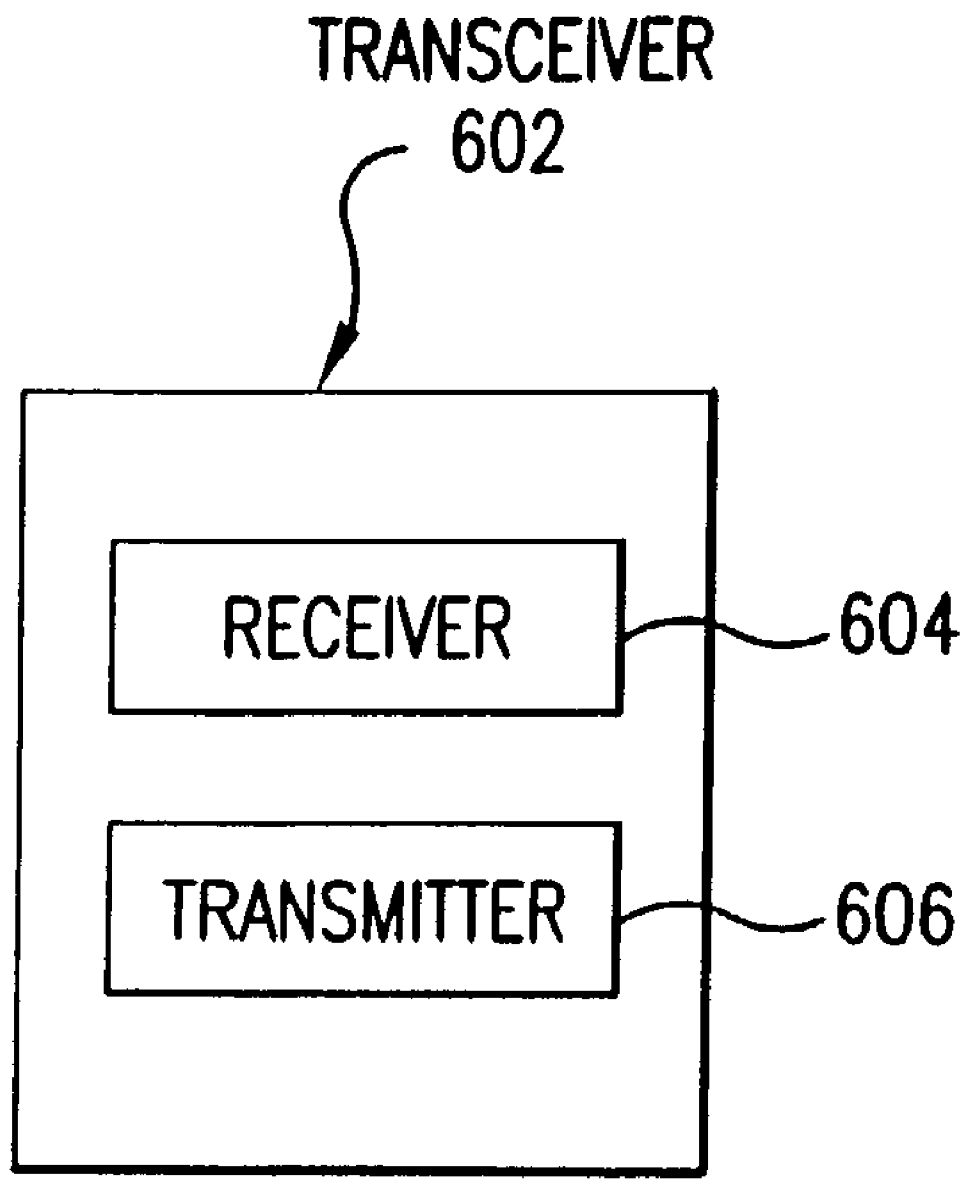
FIG. 6 is a block diagram of a transceiver according to an embodiment of the invention.

In an embodiment, as shown in FIG. 6, the receiver 604 is a component of a transceiver 602. The transceiver 602 also includes a transmitter 606.

In an embodiment, the transceiver 602 is an FRS unit that is enabled for multi-mode and multi-band operation, where the bands of operation include bands other than that associated with FRS. It is noted that this FRS embodiment is discussed herein for illustrative purposes only. The invention is not limited to this embodiment. As will be apparent to persons skilled in the relevant art(s) based on the discussion herein, the invention is applicable to other applications of receivers and transceivers.

Transmitters that are operable with the present invention include those described in pending U.S. non-provisional application "Method and System for Frequency Up-Conversion," Ser. No. 09/176,154, filed Oct. 21, 1998, which is incorporated herein by reference in its entirety. Other transmitters applicable with the present invention include those described in copending U.S. patent applications "Image-Reject Down-Converter and Embodiments Thereof, Such as the Family Radio Service," Ser. No. 09/476,091, "Analog Zero IF FM Decoder and Embodiments Thereof, Such as the Family Radio Service," Ser. No. 09/476,092, and "Multi-Mode, Multi-Band Communication System," Ser. No. 09/476,330, which are incorporated by reference in their entireties.

Figure 5A:
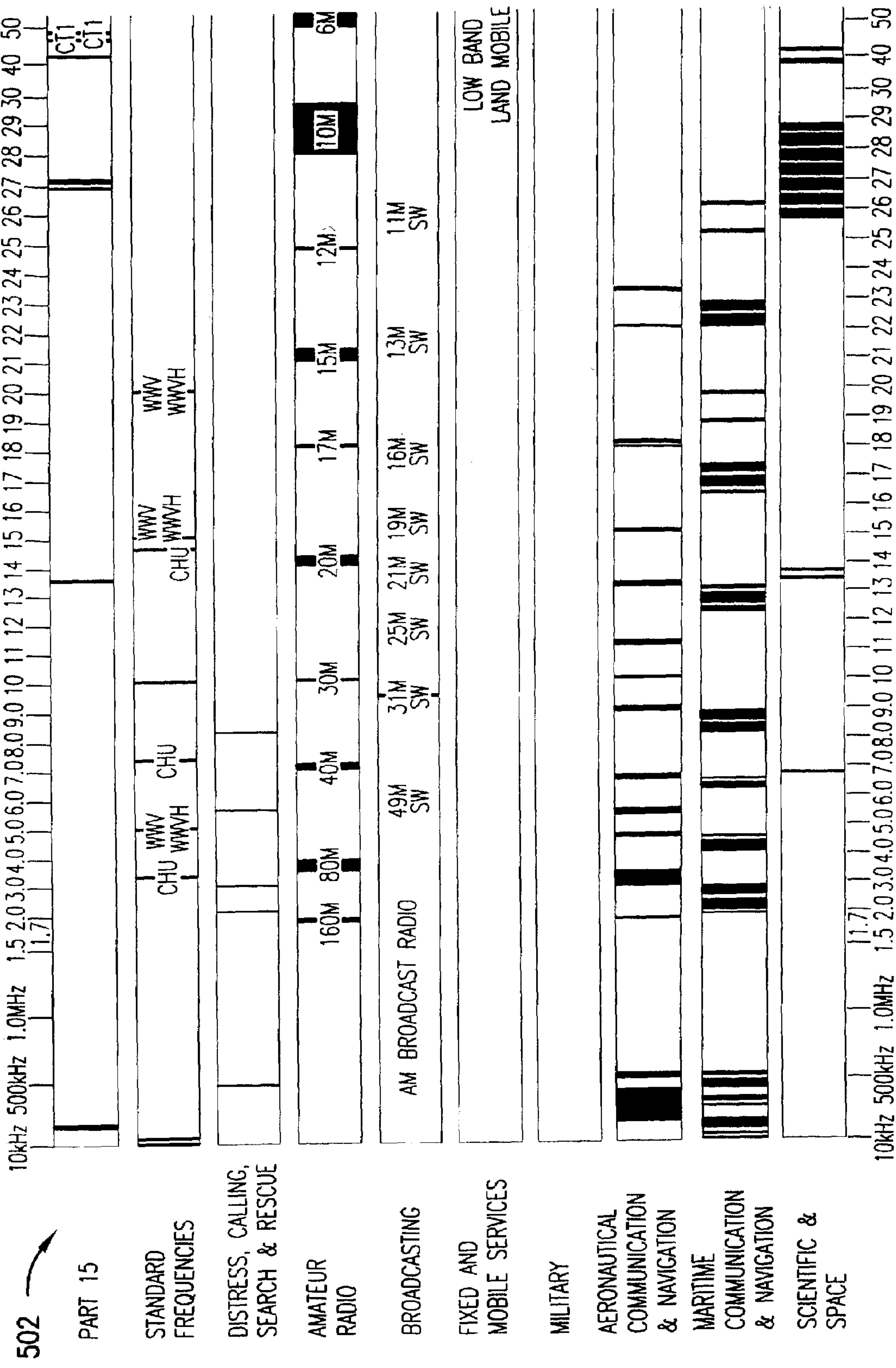
FIGS. 5A–5D depict some frequency allocations operable with the present invention.
Figure 5B:
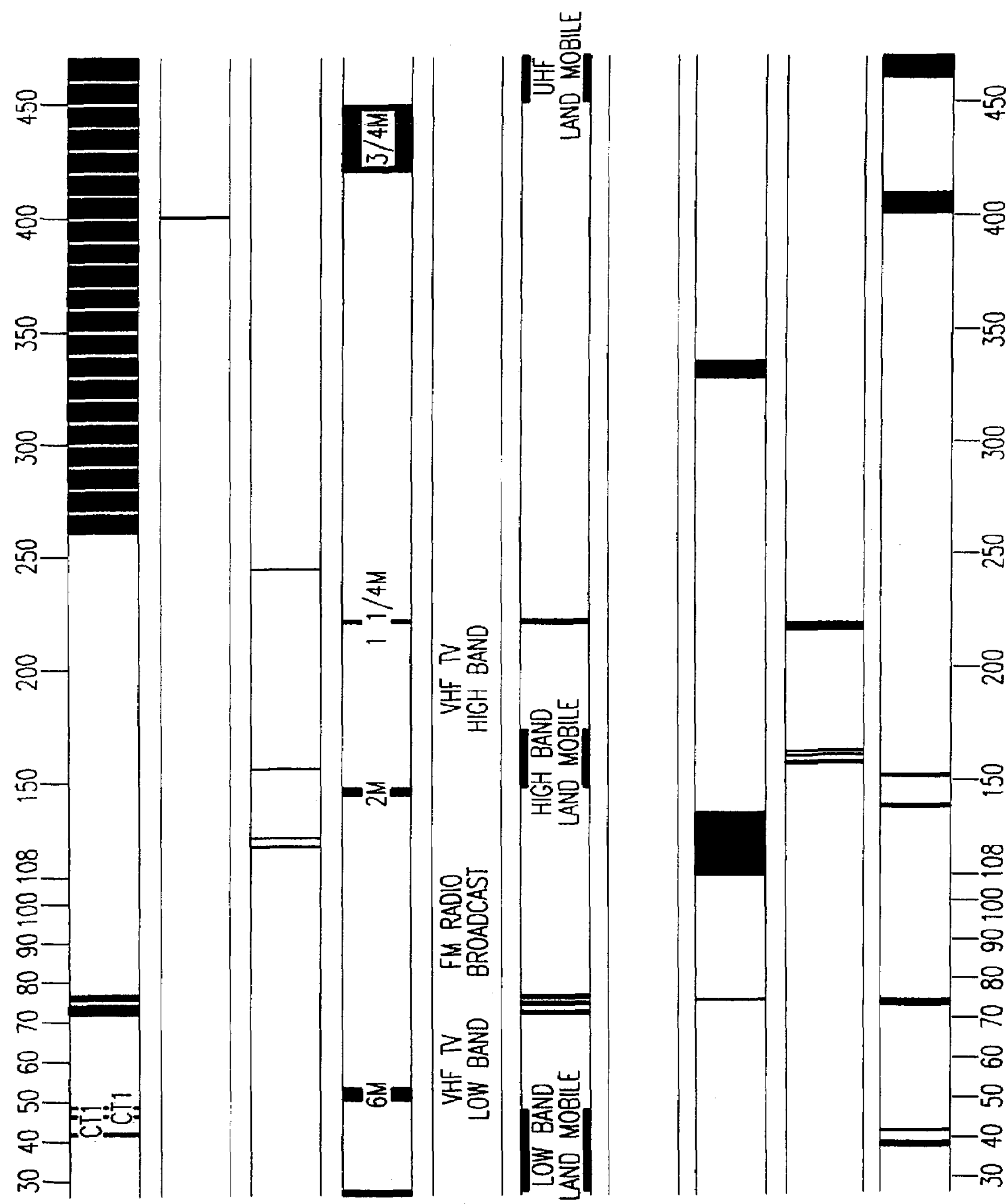
Figure 5C:
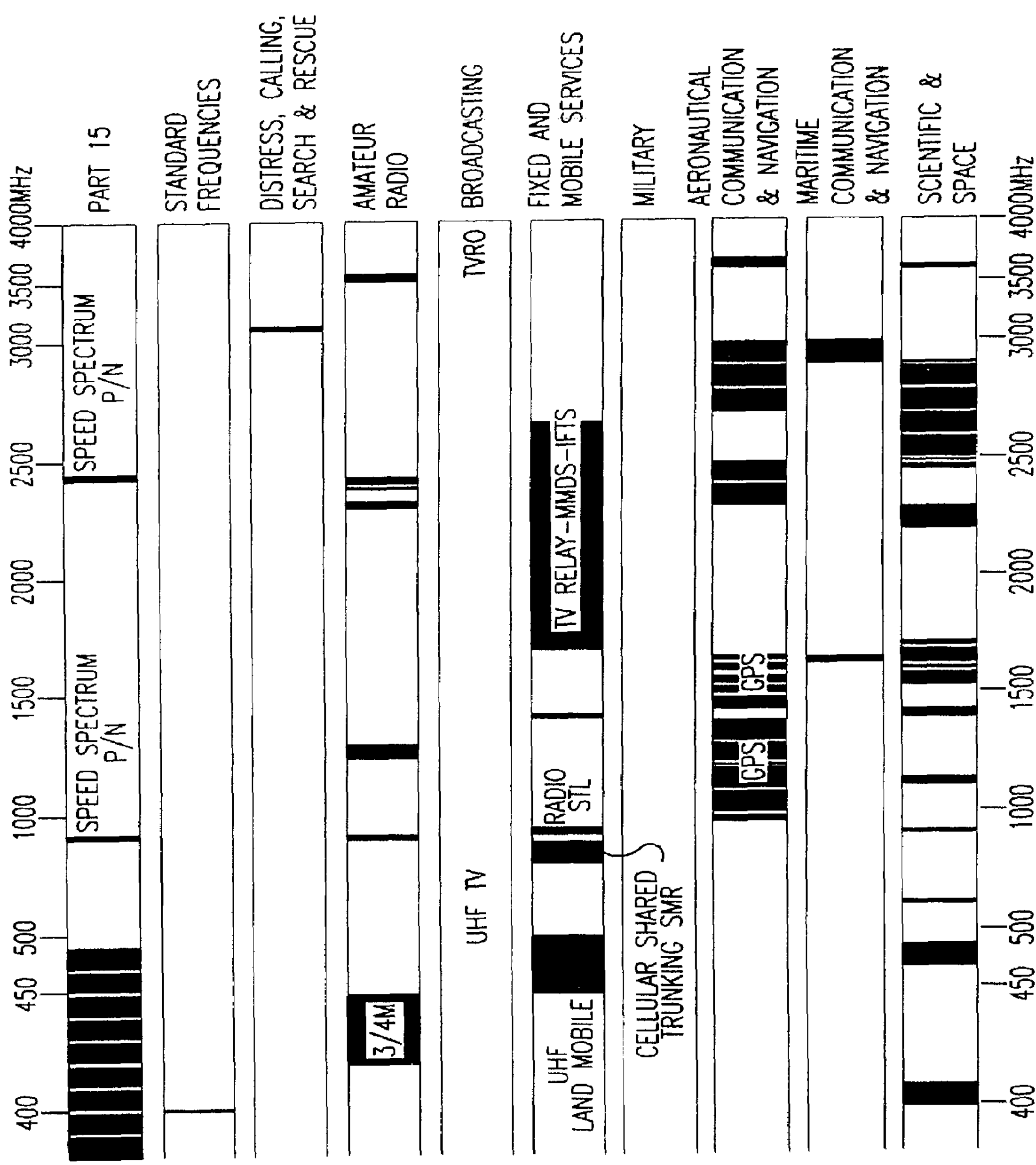
Figure 5D:
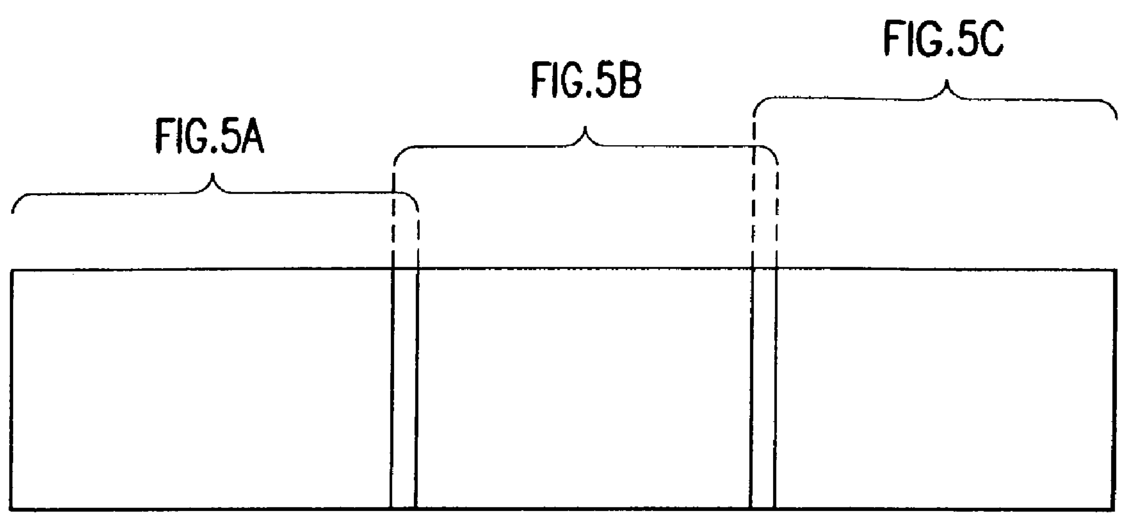

In an embodiment, the receiver is operable at a plurality of frequency bands. For example, the receiver is operable at at least all U.S. frequency allocations from 10 KHz to 4 GHz, as illustrated in FIGS. 5A–5C. FIG. 5D illustrates the orientation of FIGS. 5A–5C. As indicated in FIG. 5D, for illustrative purposes, FIG. 5A partially overlaps with FIG. 5B, which partially overlaps with FIG. 5C. It should be understood that this embodiment is described for illustrative purposes. The invention is not limited to these bands. As will be appreciated by persons skilled in the relevant art(s) based on the discussion herein, embodiments of the invention are applicable at other frequency ranges.

Structure of the Invention

Figure 1:
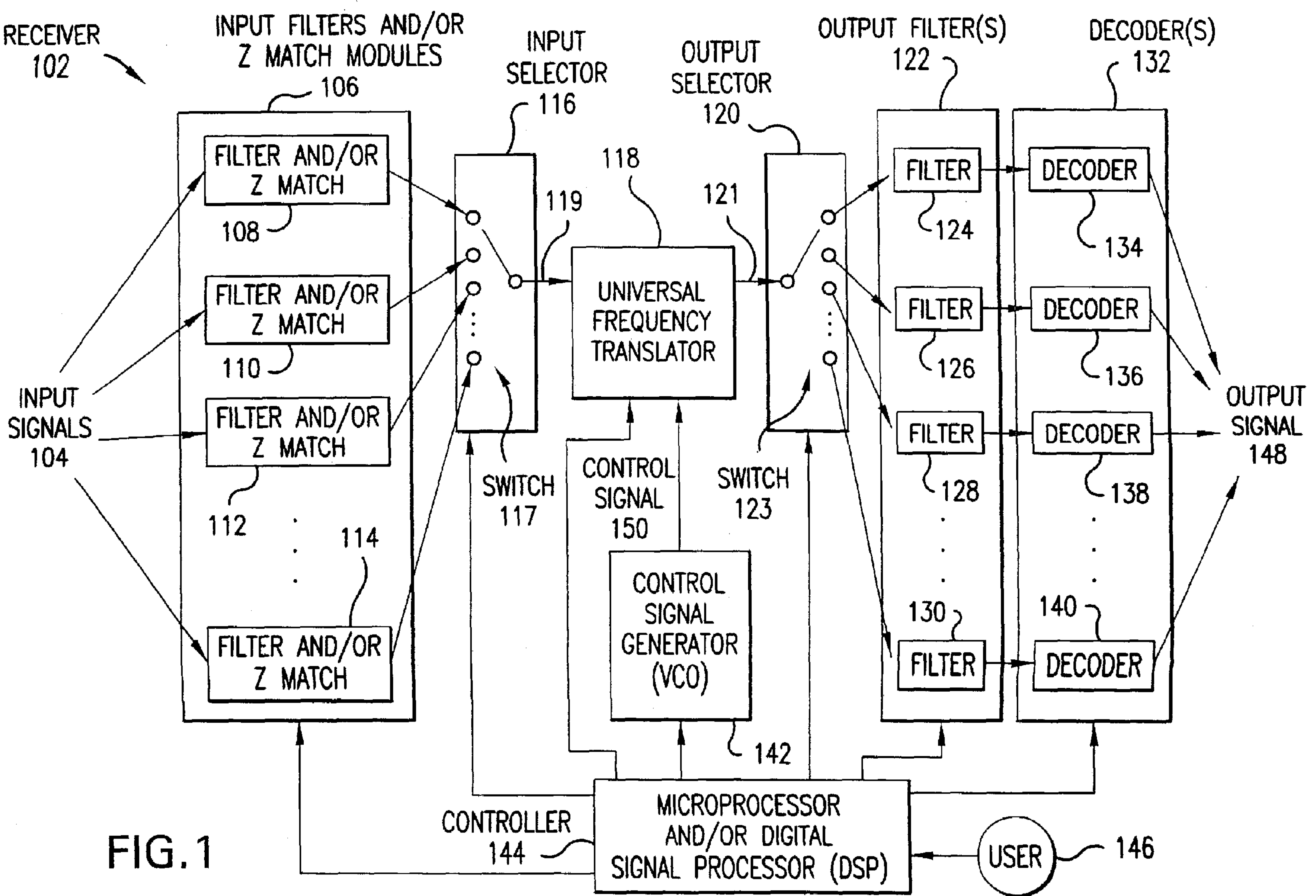
FIG. 1 is a block diagram of a receiver according to an embodiment of the invention.

FIG. 1 is a block diagram of a receiver 102 according to an embodiment of the invention. The receiver 102 includes one or more input filters and/or Z match modules 106, an input selector 116, a universal frequency translator 118, an output selector 120, one or more output filters 122, one or more decoders 132, a control signal generator 142, and a controller 144.

In an embodiment, the input filters and/or Z match (impedance match) modules 106 include filter and/or Z match modules 108, 110, 112, 114 (four such modules are shown in FIG. 1, but the invention is not limited to this embodiment). Each input filter and/or Z match module 108, 110, 112, 114 operates to select or pass a frequency band. Accordingly, each input filter and/or Z match module 108, 110, 112, 114 operates as a band select filter. Preferably, each input filter and/or Z match module 108, 110, 112, 114 is configured to pass a frequency band of interest.

Where necessary, each input filter and/or Z match module 108, 110, 112, 114 also operates to impedance match the input to downstream circuitry. A variety of filters and Z match modules operable for use with the present invention will be apparent to persons skilled in the relevant art(s) based on the discussion herein. Filters and Z match modules are also described in U.S. non-provisional applications "Method and System for Down-Converting Electromagnetic Signals," Ser. No. 09/176,022, filed Oct. 21, 1998, "Integrated Frequency Translation and Selectivity," Ser. No. 09/175,966, filed Oct. 21, 1998, "Image-Reject Down-Converter and Embodiments Thereof, Such as the Family Radio Service," Ser. No. 09/476,091, "Analog Zero IF FM Decoder and Embodiments Thereof, Such as the Family Radio Service," Ser. No. 09/476,092, and "Multi-Mode, Multi-Band Communication System," Ser. No. 09/476,330, which are incorporated herein by reference in their entireties.

In an alternative embodiment, the receiver 102 includes a single filter and/or Z match module that is adjustable over a plurality of frequency bands. In another embodiment, the receiver 102 includes a plurality of filters and/or Z match modules that are adjustable over a plurality of frequency bands. Reference is made, for example, to U.S. non-provisional application "Integrated Frequency Translation and Selectivity," Ser. No. 09/175,966, filed Oct. 21, 1998, incorporated herein by reference in its entirety.

In an embodiment, the input selector 116 operates to select one of a plurality of input signals. The selected input signal is passed to an output. In an embodiment, the input selector 116 includes a switch 117. The switch 117 includes a plurality of input nodes and an output node. The switch 117 connects one of the input nodes to the output node. A variety of switching devices or other types of devices capable of performing the functionality of the input selector 116 will be apparent to persons skilled in the relevant art(s) based on the discussion herein.

In an embodiment, the universal frequency translator (UFT) 118 down-converts an input signal 119. The UFT 118 may down-convert the input signal 119 to an IF signal, or to a demodulated baseband signal. In particular, the rate of a control signal 150 determines whether the input signal 119 is down-converted to an IF signal, or down-converted to a demodulated baseband signal. Other down-conversion options are also possible using the UFT 118. Generally, relationships between the input signal 119, the rate of the control signal 150, and the down-converted output signal 121 are illustrated below:

$$(\text{Freq. of input signal } \mathbf{119}) = n \cdot (\text{Freq. of control signal } \mathbf{150}) \pm (\text{Freq. of down-converted output signal } \mathbf{121})$$

For the examples contained herein, for illustrative purposes only and without limitation, only the "+" condition will be discussed. The value of n represents a harmonic or sub-harmonic of the input signal 119 (e.g., n=0.5, 1, 2, 3, . . . ).

The UFT 118 is further described in U.S. non-provisional application "Method and System for Down-Converting Electromagnetic Signals," Ser. No. 09/176,022, filed Oct. 21, 1998, "Image-Reject Down-Converter and Embodiments Thereof, Such as the Family Radio Service," Ser. No. 09/476,091, "Analog Zero IF FM Decoder and Embodiments Thereof, Such as the Family Radio Service," Ser. No. 09/476,092, and "Multi-Mode, Multi-Band Communication System," Ser. No. 09/476,330, which are incorporated herein by reference in their entireties.

The control signal generator 142 generates a control signal 150. The frequency of the control signal 150 is adjustable. In an embodiment, the control signal generator 142 includes a voltage controlled oscillator (VCO). VCO and other types of devices operable for performing the functionality of the control signal generator 142 will be apparent to persons skilled in the relevant art(s) based on the discussion herein. In embodiments, the control signal generator 142 may include circuitry to modify characteristics of the control signal 150, such as adjusting the pulse widths of the control signal 150. Such aspects are described in U.S. non-provisional application "Method and System for Down-Converting Electromagnetic Signals," Ser. No. 09/176,022, filed Oct. 21, 1998, incorporated herein by reference in its entirety.

In an embodiment, the output selector 120 operates to route an input signal to one of a plurality of output nodes. In an embodiment, the output selector 120 includes a switch 123. The switch 123 includes an input node and a plurality of output nodes. The switch 123 connects one of the output nodes to the input node. A variety of switching devices or other types of devices capable of performing the functionality of the output selector 120 will be apparent to persons skilled in the relevant art(s) based on the discussion herein.

In an embodiment, the output filters 122 include filters 124, 126, 128, 130 (four such modules are shown in FIG. 1, but the invention is not limited to this embodiment). Each filter 124, 126, 128, 130 operates to select or pass a frequency channel. Accordingly, each filter 124, 126, 128, 130 operates as a channel select filter. Preferably, each filter 124, 126, 128, 130 is configured to pass a frequency channel of interest. A variety of filters operable for use with the present invention will be apparent to persons skilled in the relevant art(s) based on the discussion herein. Filters are also described in U.S. non-provisional application "Integrated Frequency Translation and Selectivity," Ser. No. 09/175,966, filed Oct. 21, 1998, incorporated herein by reference in its entirety.

In an alternative embodiment, the receiver 102 includes a single output filter that is adjustable over a plurality of frequency bands. In another embodiment, the receiver 102 includes a plurality of output filters modules that are adjustable over a plurality of frequency bands. Reference is made, for example, to U.S. non-provisional application "Integrated Frequency Translation and Selectivity," Ser. No. 09/175,966, filed Oct. 21, 1998, incorporated herein by reference in its entirety.

In an embodiment, the receiver 102 includes decoders 132. Decoders 132 preferably include a plurality of decoders 134, 136, 138, 140 (four such devices are shown in FIG. 1, but the invention is not limited to this example). Decoders 134, 136, 138, 140 decode an input signal to obtain an output signal 148. The decoders 134, 136, 138, 140 are preferably configured to operate with signals of interest. A variety of decoders operable for use with the present invention will be apparent to persons skilled in the relevant art(s) based on the discussion herein.

The operation of many if not all of the components of the receiver 102 is adjustable. Such adjustability is discussed above, and further discussed below. According to an embodiment, a controller 144 issues commands to the components of the receiver 102. Such commands control the operation of such components. In an embodiment, the controller 144 is implemented using a microprocessor and/or a digital signal processor (DSP). The controller 144 may receive instructions and/or data from users 146.

The operation of the receiver 102 shall now be described.

The receiver 102 receives input signals 104 over some communication medium. The communication medium may be any communication medium, including but not limited to a wireless medium or a wired medium, or a combination thereof. The input signals 104 may include information present in a plurality of channels of a plurality of frequency bands. For example, the input signals 104 may include, without limitation, information present in one or more AM channels, one or more FM channels, one or more CB channels, one or more TV channels, one or more FRS channels, one or more Weatherband channels, local area networks, etc.

The input signals 104 are received by the input filters and/or Z match modules 108, 110, 112, 114. Each of the input filters and/or Z match modules 108, 110, 112, 114 are configured to pass a frequency band of interest. For example, the input filter and/or Z match module 108 may be configured to pass the AM band. The input filter and/or Z match module 110 may be configured to pass a band of frequencies associated with a local area network (LAN). The input filter and/or Z match module 112 may be configured to pass the FRS band. The input filter and/or Z match module 114 may be configured to pass the Weather band. The input filters and/or Z match modules 108, 110, 112, 114 pass those input signals 104 that fall within their respective bands.

The filter and/or Z match modules 108, 110, 112, 114 generate filtered signals. These filtered signals are received by the input selector 116. At any instance of time, the input selector 116 routes one of these filtered signals to the universal frequency translator (UFT) 118. Switching and routing by the input selector 116 is controlled by the controller 144. The filtered signal that is routed to the UFT 118 corresponds to a channel/band combination that is currently being processed or monitored (this channel/band combination is referred to as the "current channel/band").

The UFT 118 down-converts the filtered signal that it receives from the input selector 116 to a lower frequency suitable for down-stream processing. The operation of the UFT 118 is controlled by the controller 144. For example, the controller 144 establishes the frequency of the control signal 150 generated by the control signal generator 142, which controls the down-conversion operation performed by the UFT 118.

The output selector 120 routes the down-converted signal to an output filter 122 associated with the current channel/band. Switching and routing performed by the output selector 120 is controlled by the controller 144. Assume, for example purposes, that the filter 126 is associated with the current channel/band. In this case, the output selector 120 routes the down-converted signal to the filter 126.

The filter 126 is configured to pass a channel within the band of the "current channel/band." The channel filtered signal is passed to the decoder 136 coupled to the filter 126.

The decoder 136 decodes the channel filtered signal to obtain the output signal 148. The output signal 148 is thereafter processed in an application dependent manner.

Figure 2:
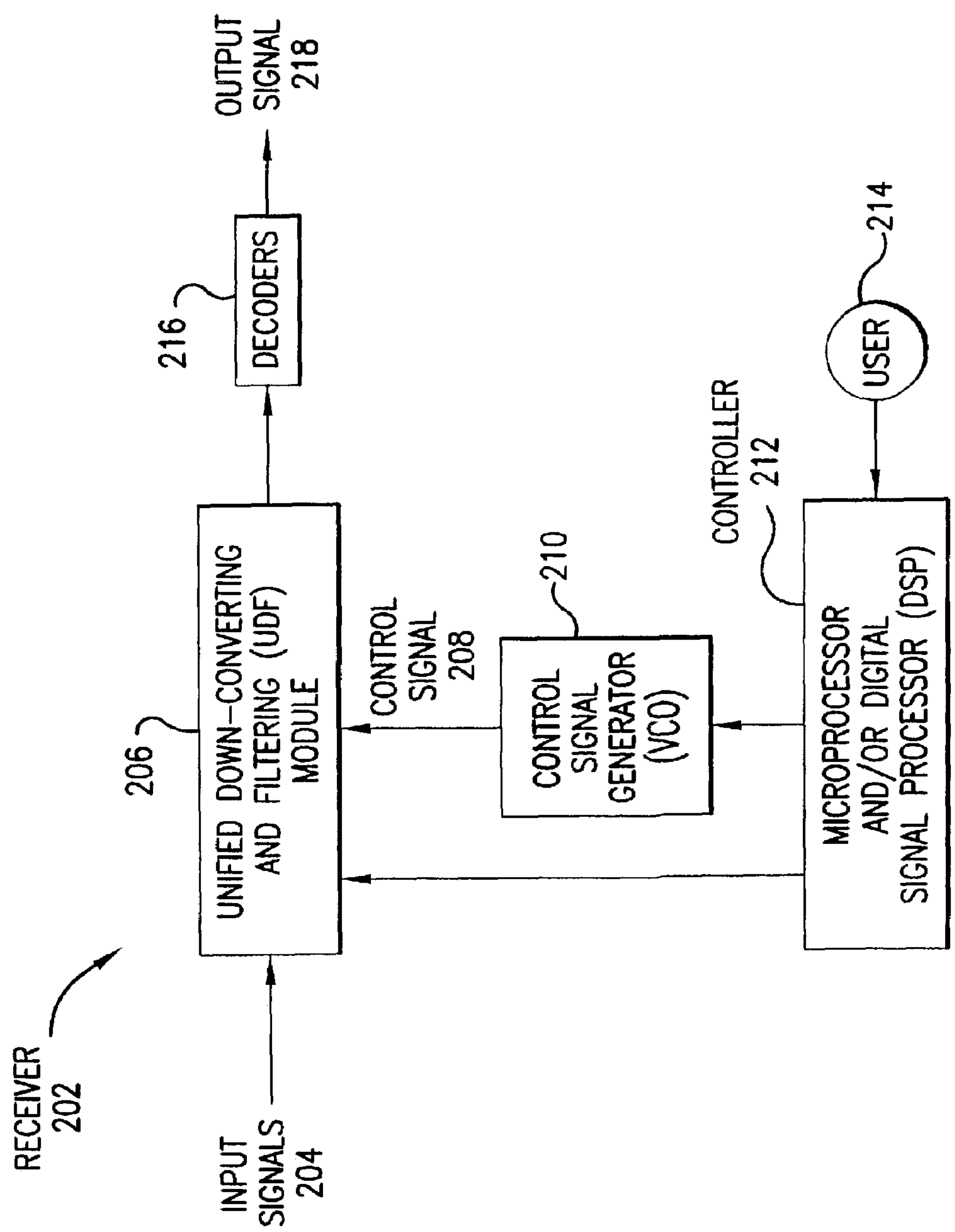
FIG. 2 is a block diagram of a receiver according to an alternative embodiment of the invention.

FIG. 2 illustrates a receiver 202 according to an alternative embodiment of the invention. The receiver 202 includes a unified down-converting and filtering (UDF) module 206.

The UDF module 206 performs frequency selectivity and frequency translation as a single unified (i.e., integrated) operation. By performing frequency selectivity and translation as a single unified operation, the invention achieves high frequency selectivity prior to frequency translation. The invention achieves high frequency selectivity at any input frequency (the input frequency refers to the frequency of the input spectrum being filtered and translated), including but not limited to RF (radio frequency) and greater frequencies. It should be understood that the invention is not limited to this example of RF and greater frequencies. The invention is intended, adapted, and capable of working with lower than radio frequencies.

The effect achieved by the UDF module 206 is to perform the frequency selectivity operation prior to the performance of the frequency translation operation. Thus, the UDF module 206 effectively performs input filtering.

According to embodiments of the present invention, such input filtering involves a relatively narrow bandwidth. For example, in the embodiment of FIG. 2, such input filtering represents channel select filtering, where the filter bandwidth may be, for example and without limitation, 50 KHz to 150 KHz. It should be understood, however, that the invention is not limited to these frequencies. The invention is intended, adapted, and capable of achieving filter bandwidths of less than and greater than these values.

The UDF module 206 of the present invention includes a number of advantages. For example, high selectivity at high frequencies is realizable using the UDF module 206. This feature of the invention is evident by the high Q factors that are attainable. For example, and without limitation, the UDF module 206 can be designed with a filter center frequency $f_C$ on the order of 900 MHZ, and a filter bandwidth on the order of 50 KHz. This represents a Q of 18,000, as indicated by the equation $$(900\cdot 10^6)\div(50\cdot 10^3)=18,000$$

It should be understood that the invention is not limited to filters with high Q factors. The filters contemplated by the present invention may have lesser or greater Qs, depending on the application, design, and/or implementation. Also, the scope of the invention includes filters where Q factor as described herein is not applicable.

The invention exhibits additional advantages. For example, the filtering center frequency $f_C$ and other filtering characteristics of the UDF module 206 can be electrically adjusted, either statically or dynamically.

Also, the frequency translation characteristics of the UDF module 206 can be electrically adjusted, either statically or dynamically.

Also, the UDF module 206 can be designed to amplify input signals 204.

Further, the UDF module 206 can be implemented without large resistors, capacitors, or inductors. Also, the UDF module 206 does not require that high tolerances be maintained on its individual components, i.e., its resistors, capacitors, inductors, etc. As a result, the architecture of the UDF module 206 is friendly to integrated circuit design techniques and processes.

The UDF module 206 operationally replaces the band select filtering, frequency translation, and channel select filtering operations performed by the input filters and/or Z match modules 106, the UFT 118, and the output filters 122 of the receiver 102 of FIG. 1.

The output of the UDF module 206 is a channel filtered and down-converted signal corresponding to the current channel/band. The filtering and down-conversion characteristics of the UDF module 206 are adjusted pursuant to the current channel/band (so as to appropriately process the current channel/band) based on commands issued by the controller 212 to the UDF 206 and the control signal generator 210.

The channel filtered and down-converted signal generated by the UDF module 206 is received by decoder(s) 216. The receiver 202 may include an output selector (not shown), similar to that described with respect to FIG. 1, to route the channel filtered and down-converted signal to one of the decoders 216 associated with the current channel/band. Alternatively, the decoders 216 may represent an adjustable decoder whose operation is controlled by the controller 212. The decoder then decodes the channel filtered and down-converted signal to produce the output signal 218. The output signal 218 is thereafter processed in an application dependent manner.

The UDF module is further described in U.S. non-provisional application "Integrated Frequency Translation and Selectivity," Ser. No. 09/175,966, filed Oct. 21, 1998, incorporated herein by reference in its entirety.

Operation of the Invention

The operation of the receiver 604 is further described below. The receiver 604 may represent either the receiver 102 of FIG. 1, or the receiver 202 of FIG. 2. Other embodiments of the receiver 604 will be apparent to persons skilled in the relevant art(s) based on the discussion herein.

For illustrative purposes, and without limitation, the receiver 604 is considered to be a component of a transceiver 602. The transceiver 602 also includes a transmitter 606. In an embodiment, the transceiver 602 is an FRS unit enabled for multi-mode and multi-band operation, although the invention is not limited to this embodiment.

Exemplary Scenario

Figure 7:
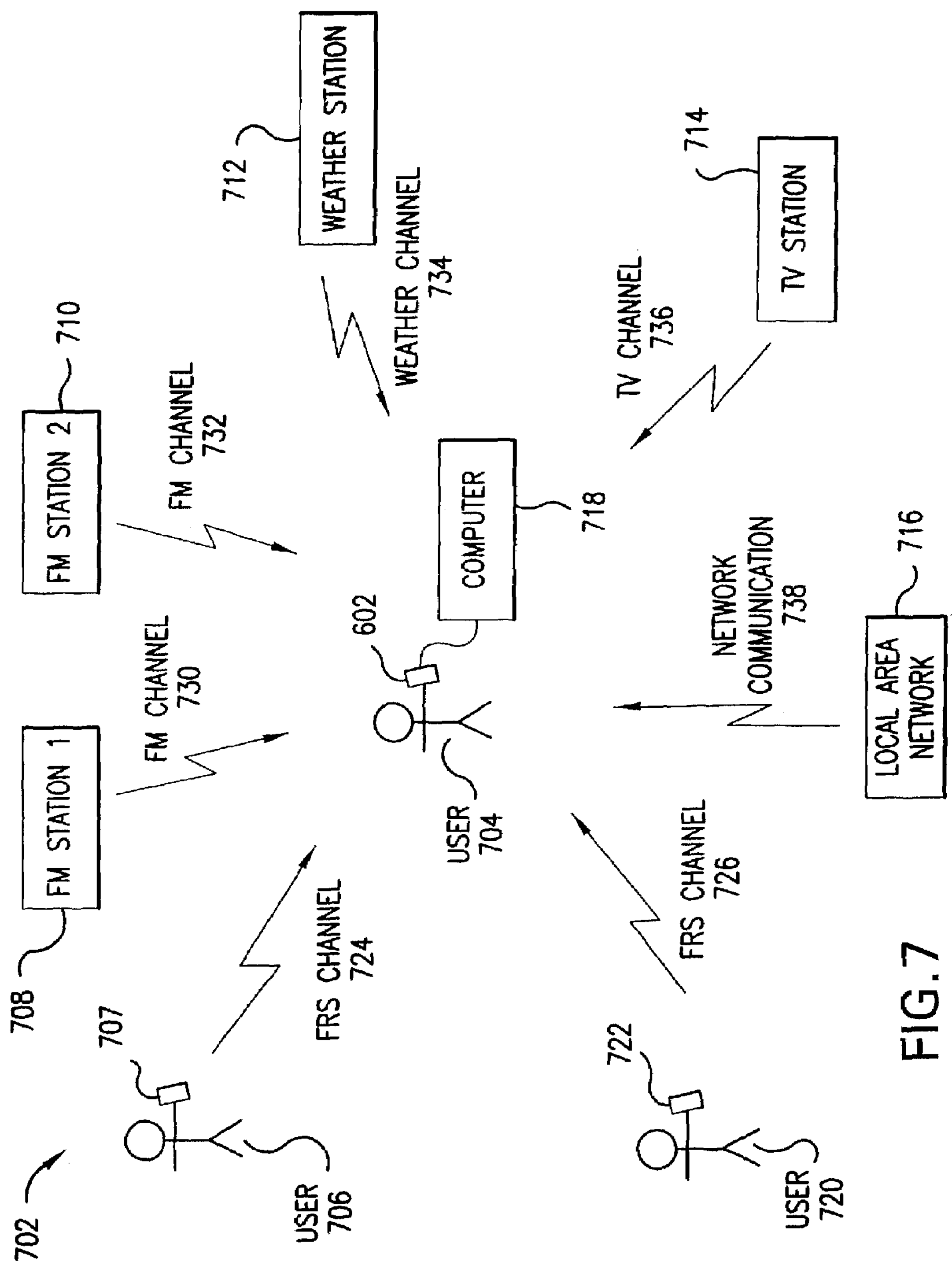
FIG. 7 illustrates an exemplary use scenario used to described the operation of an embodiment of the invention.

Consider an exemplary scenario 702 shown in FIG. 7.

A user 704 (also represented by user 146/214) has the FRS unit 602, which is coupled to a computer 718 via a wireless or wired connection (alternatively, the computer 718 may be integrated with the FRS unit 602). The user 704 is using the FRS unit 602 to communicate with user 706 (FCC rules permitting), who may be a family member. User 706 includes a second FRS unit 707, and communicates with user 704 via FRS channel 724.

The user 704 also wishes to communicate with user 720 (FCC rules permitting), who may be another family member. The user 720 includes a third FRS unit 722, and communicates with user 704 via FRS channel 726.

The user 704 also wishes to receive an FM channel 730 from FM station 708, an FM channel 732 from FM station 710, a weather channel 734 from weather station 712, a TV channel 736 from TV station 714, and network communication 738 from a local area network (LAN) 716. Such network communication 738 may be routed to and processed by computer 718.

The invention enables the user 704 to receive all of these signals (and others) using the FRS unit 602.

Referring to FIG. 1, the filter and/or Z match modules 108 and 110 may be configured for the FM band. The filters 124 and 126 may be configured for FM channels 730 and 732, respectively. Also, decoders 134 and 136 may be configured for FM channels 730 and 732, respectively. The filter and/or Z match module 112 may be configured for the weather band, and filter 128 and decoder 138 may be configured for the weather channel 734. The filter and/or Z match module 114 may be configured for an appropriate TV band, and the filter 130 and decoder 140 may be configured for TV channel 736. Other filter and/or Z match modules 106, output filters 122, and decoders 132 may be similarly configured for network communication 738, FRS channel 726, and FRS channel 724.

When user 704 wishes to receive FM channel 730, the user 704 can enter an appropriate command(s) into the FRS unit 602 to cause the FRS unit 602 to enable and/or adjust the components contained therein for operation with the FM channel 730. For example, the input selector 116 will switch to connect the filter and/or Z match module 108 to the UFT 118. The output selector 120 will switch to connect the UFT 118 to the filter 124. Also, the control signal generator 142 will generate a control signal 150 having a frequency appropriate for down-converting the FM channel 730. The user 704 may issue such commands by, for example, pressing keys on a keypad of the FRS unit 602. Other means for issuing commands are envisioned, such as voice activation.

The user 704 can easily switch to any of the other sources of information of interest. For example, if the user 704 wishes to receive the TV channel 736, the user 704 can enter an appropriate command into the FRS unit 602 to cause the FRS unit 602 to enable and/or adjust the components contained therein for operation with the TV channel 736. For example, the input selector 116 will switch to connect the filter and/or Z match module 114 to the UFT 118. The output selector 120 will switch to connect the UFT 118 to the filter 130. Also, the control signal generator 142 will generate a control signal 150 having a frequency appropriate for down-converting the TV channel 736. The user 704 may issue such commands by, for example, pressing keys on a keypad of the FRS unit 602. Other means for issuing commands are envisioned, such as voice activation.

Other modes of operation are envisioned and are within the scope and spirit of the present invention. For example, in an embodiment, the receiver 102 (or 202) has a scan mode. In the scan mode, the controller 144 automatically scans among the programmed channel/band combinations. Specifically, the components within the FRS unit 602 are adjusted for operation with a channel/band combination. After some time period, which may be pre-programmed, user programmed, dynamically programmed, random, fixed, etc., the components within the FRS unit 602 are adjusted for operation with a different channel/band combination. Such scanning operation continues until receipt of some command. It is noted that the scanning mode is not limited to programmed channel/band combinations. The receiver 102 can be instructed to scan throughout the frequency spectrum in any order and/or increment. Such functionality is achieved, in an embodiment, by taking advantage of the dynamic adjustability of the components of the receiver 102, as described above.

Also during the scan mode, or the multiple band/channel mode, the receiver can be instructed to recognize and act upon particular content. For example, and without limitation, the receiver can be instructed to listen and recognize particular content while monitoring a weather band. Such content may be a storm warning, for example. The receiver can be instructed to act in predefined ways upon receipt and recognization of such content. For example, while monitoring a weather band, if a storm warning is received, then the receiver may be programmed to issue an audible alarm and/or to switch to the weather band until further user command to enable the user to receive weather updates.

Channel/band combinations can be programmed in the receiver 102. For example, the FM channel 730 is programmed in the receiver 102 by adjusting or otherwise establishing the filter and/or Z match 108 for operation in the FM band, by adjusting or otherwise establishing the filter 124 and the decoder 134 for operation with the FM channel 730, programming the controller 144 with information sufficient for generating a control signal 150 (using the control signal generator 142) having a frequency suitable for down-converting the FM channel 730, and also programming the controller 144 with information to control the input selector 116 and the output selector 120 when operating with the FM channel 730.

Channel/band combinations can be pre-programmed, user programmed, downloaded from an information source such as the Internet or a computer, or via any well known programming means.

The operation of the FRS unit 602 is further described below.

Single Band/Channel Operation

The invention supports a variety of modes, as indicated above. Additional modes of operation will be apparent to persons skilled in the relevant art(s) based on the discussion herein.

One of the modes supported by the invention is a single band/channel mode. In this mode, the receiver is configured to receive information in a particular channel of a particular frequency band. The receiver may be dynamically reconfigured to listen to other channels and/or other bands.

Figure 3:
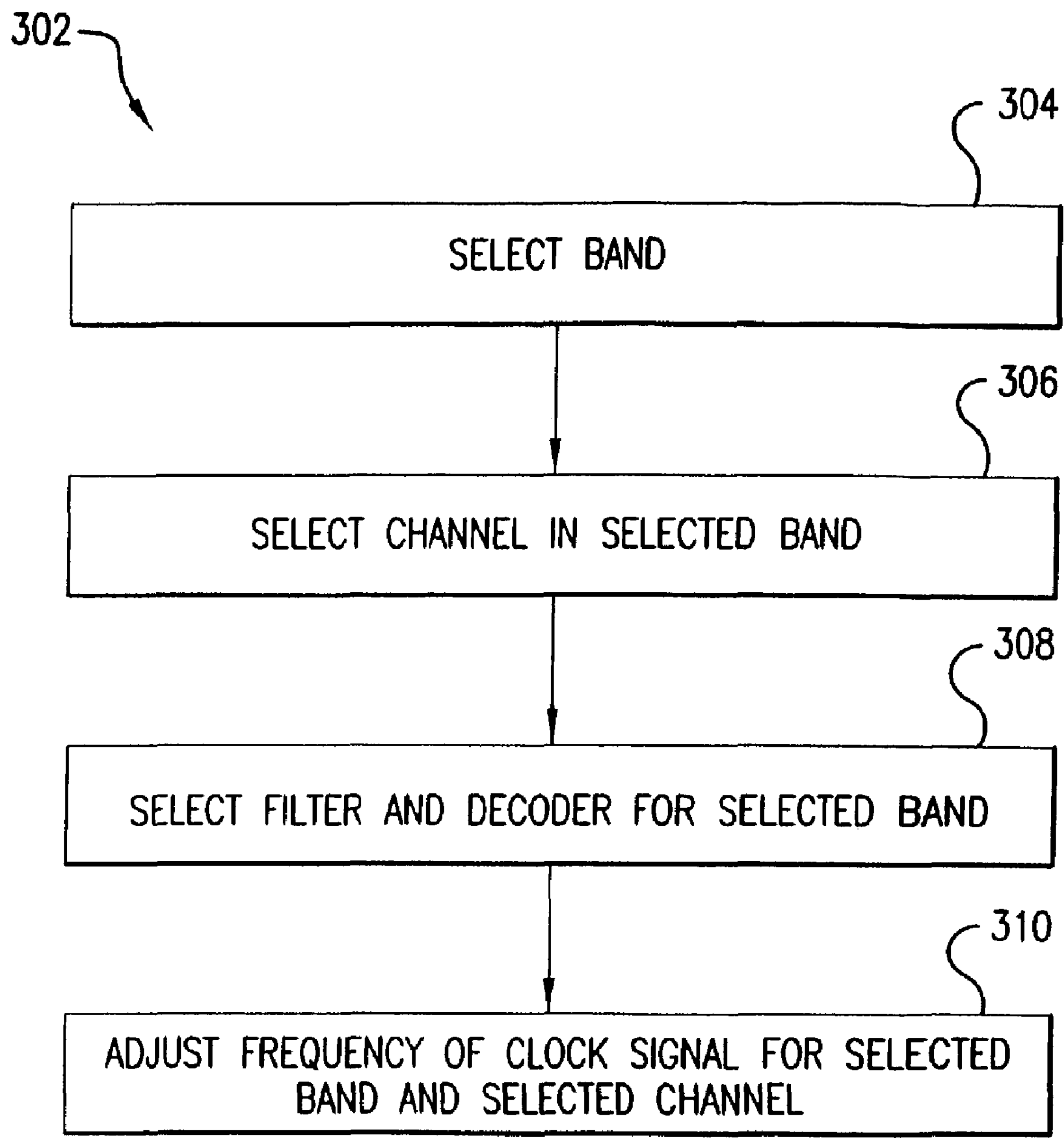
FIG. 3 is a flowchart of the invention when operating according to a single band/channel mode.

FIG. 3 illustrates a flowchart 302 that depicts in greater detail the operation of the receiver when in the single band/channel mode. It is noted that the ordering of the steps shown in FIG. 3 is not mandatory. Other orderings of the steps of FIG. 3 are possible and within the scope and spirit of the present invention. Such other orderings will be apparent to persons skilled in the relevant art(s) based on the discussion herein.

In step 304, a band is selected.

In step 306, a channel within the selected band is selected. The selected channel/band combination represents the channel and band that are to be monitored/received by the receiver. The band and channel can be selected in steps 304 and 306 using any of the procedures discussed above, such as having a user enter an appropriate command, during the scan function, due to an interrupt or time-based command, etc.

In step 308, with respect to the embodiment of FIG. 1, the controller 144 selects the input filter and/or Z match module 106, the output filter 122, and the decoder 132 that are configured for operation with the selected channel/band. Alternatively, with respect to the embodiment of FIG. 2, the controller 212 instructs/adjusts the UDF 206 and selects the decoder 216 for appropriate operation with the selected channel/band.

In step 310, the controller 144/212 causes the control signal generator 142/210 to generate a control signal 150/208 having a frequency suitable for down-converting the selected channel/band.

Steps 304–310 may be repeated for another channel/band.

Multiple Band/Channel Operation

The receiver also supports a multiple band/channel mode. As noted above, in the multiple band/channel mode, the receiver is configured to receive information in one or more channels in one or more frequency bands. For example, and without limitation, the receiver could be configured to receive information in a plurality of channels of a single band, or one or more channels of a plurality of bands. A channel in a band that is being monitored (i.e., a channel in a band that the receiver is listening to) is herein referred to as a channel/band combination.

The receiver preferably listens to each channel/band combination for a finite period of time. After the time period of a given channel/band combination expires, the receiver listens to another channel/band combination for a limited amount of time.

In an embodiment, the receiver listens to the channel/band combinations in a round robin manner. The receiver listens to each channel/band combination for the same time duration. In other embodiments, the receiver listens to the channel/band combinations in other orders. For example, a user may specify the order in which the channel/band combinations are listened to by the receiver. The user may specify that some channel/band combinations are listened to more often than others. The user may specify that some channel/band combinations are listened to for durations different than the durations associated with other channel/band combinations.

Figure 4:
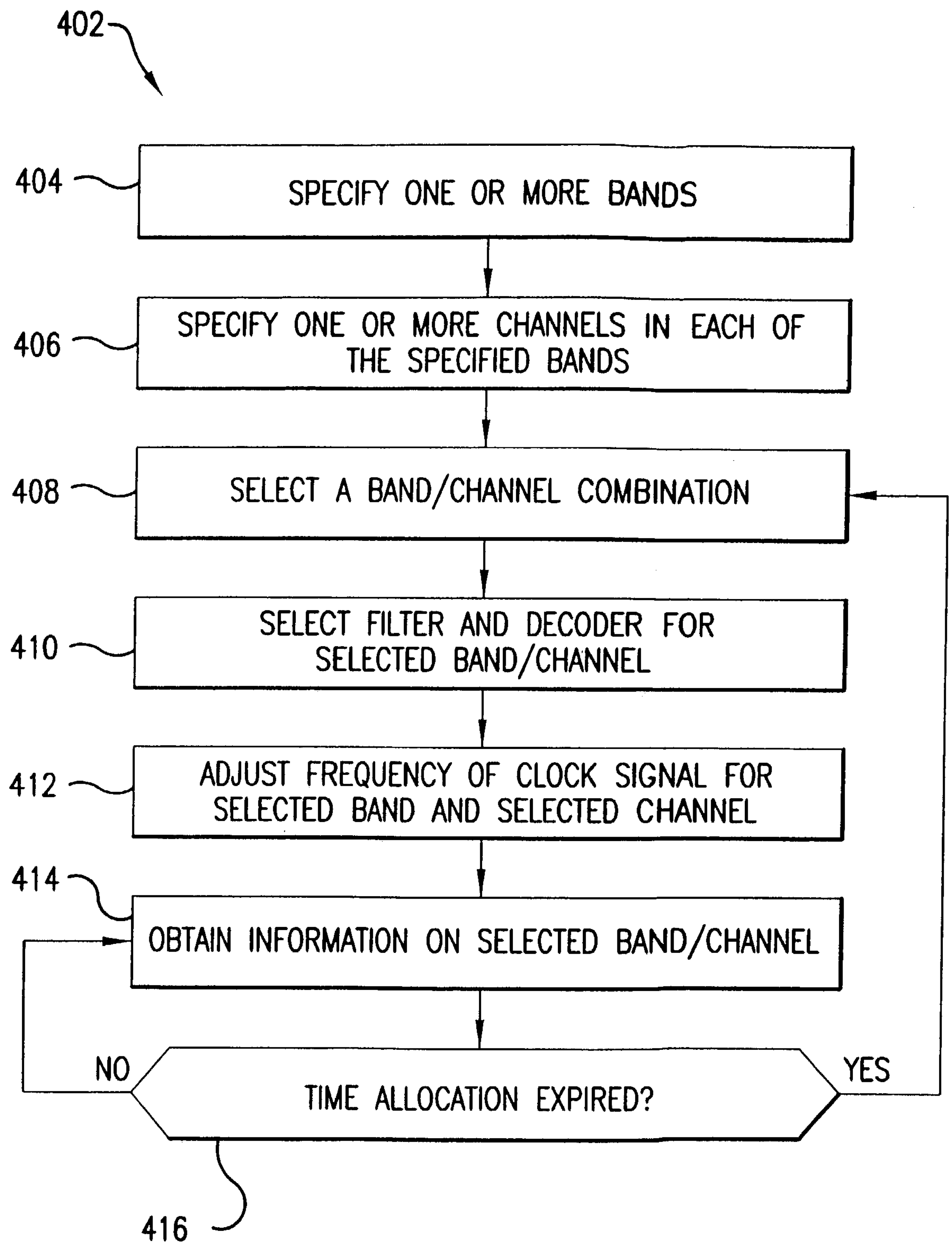
FIG. 4 is a flowchart of the invention when operating according to a multiple band/channel mode.

FIG. 4 illustrates a flowchart 402 which depicts in greater detail the operation of the receiver when operating in the multiple band/channel mode.

In step 404, one or more bands are selected.

In step 406, for each of the selected bands, one or more channels are selected. The selected channel/band combinations represent the channels and bands that are to be monitored/received by the receiver. The bands and channels can be selected in steps 404 and 406 using any of the procedures discussed above, such as having a user enter appropriate commands, during the scan function, due to an interrupt or time-based command, etc. As discussed above, in some scan modes, the receiver is instructed to search over the entire frequency spectrum, or a specified portion of the spectrum. In this case, the channel/band combinations represent frequencies in the specified portion of the spectrum.

In step 408, one of the channel/band combinations is selected for monitoring.

In step 410, with respect to the embodiment of FIG. 1, the controller 144 selects the input filter and/or Z match module 106, the output filter 122, and the decoder 132 that are configured for operation with the selected channel/band combination. Alternatively, with respect to the embodiment of FIG. 2, the controller 212 instructs/adjusts the UDF 206 and selects the decoder 216 for appropriate operation with the selected channel/band combination.

In step 412, the controller 144/212 causes the control signal generator 142/210 to generate a control signal 150/208 having a frequency suitable for down-converting the selected channel/band combination.

In step 414, the selected channel/band combination is monitored.

In step 416, the controller 144/212 determines whether a time duration associated with the selected channel/band combination has expired. The time duration may differ for different channel/band combinations, or may be the same for all.

If the time duration has not expired, then the receiver continues to monitor the selected channel/band combination. This is represented by the return to step 414. If the time duration has expired, then another channel/band combination is selected. This is represented by the return to step 408.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for communicating, comprising the steps of:

(1) identifying a radio frequency band from the electromagnetic (EM) spectrum as a band of interest;

(2) identifying a channel within said band of interest as a channel/band combination;

(3) filtering said EM spectrum thereby passing said channel/band combination;

(4) aliasing said channel/band combination according to an aliasing signal, said aliasing signal having an aliasing frequency, said aliasing frequency being a function of a clock signal, thereby generating a down-converted baseband signal including said channel/band combination; and (5) filtering said down-converted baseband signal, thereby passing said channel as a filtered down-converted baseband signal.

2. The method of claim 1, wherein said clock signal has a clock frequency, the method further comprising the step of:

(6) adjusting said clock frequency for said channel/band combination so that said aliasing frequency is suitable for down-converting said channel/band combination.

3. The method of claim 1, further comprising the step of:

(6) decoding said filtered down-converted signal to create a decoded down-converted signal.

4. A system for communicating, comprising:

a controller that operates under the direction of a user, and that issues a first command signal and a second command signal;

a controller signal generator to generate a control signal according to said first command signal; and a down-converting and filtering (UDF) module to filter and down-convert one or more input signals based on said control signal and according to said second command signal, said UDF to alias said filtered input signal according to an aliasing signal, said aliasing signal having an aliasing frequency, said aliasing frequency being a function of a clock signal, and thereby output a channel filtered and down-converted signal.

5. The system of claim 4, further comprising a decoder to generate a decoded output signal from said channel filtered and down-converted signal.

6. The system of claim 5, wherein said controller issues a third command signal, and wherein said decoder operates according to said third command signal.

7. The system of claim 4, wherein said control signal generator is a voltage controlled oscillator.

8. A method of communicating, comprising the steps of:

(1) identifying one or more radio frequency bands from the electromagnetic spectrum as bands of interest;

(2) identifying one or more channels within each of said bands of interest as channel/band combinations;

(3) identifying one of said channel/band combinations as a monitored channel/band combination;

(4) causing an input filter to operate with said monitored channel/band combination, and filtering an input signal using said input filter, to create a filtered signal having a frequency within said monitored channel/band combination;

(5) aliasing said filtered signal according to an aliasing signal, said aliasing signal having an aliasing frequency, said aliasing frequency being a function of a clock signal, thereby generating a down-converted baseband signal; and (6) causing an output filter to operate with said monitored channel/band combination, and filtering said down-converted baseband signal using said output filter, thereby generating a down-converted baseband signal.

9. The method of claim 8, wherein said clock signal has a clock frequency, the method further comprising the step of:

(7) adjusting said clock frequency for said monitored channel/band combination so that said aliasing frequency is suitable for down-converting said channel/band combination.

10. The method of claim 8, further comprising the steps of:

(7) selecting a decoder to be a selected decoder, said selected decoder being configured to operate with said monitored channel/band combination; and (8) using said selected decoder to create a decoded down-converted signal from said filtered down-converted signal.

11. The method of claim 8, further comprising the steps of:

(7) repeating steps (3) through (6).

12. A system for communicating, comprising:

an input filter module comprised of one or more input filters to filter one or more input signals so as to generate one or more filtered input signals;

a universal frequency translator to down-convert at least one of said one or more filtered input signals to generate a down-converted baseboard signal, said universal frequency translator comprising means for aliasing said filtered input signal according to an aliasing signal, said aliasing signal having an aliasing frequency, said aliasing frequency being a function of a clock signal, thereby generating said down-converted baseband signal; and an output filter module comprised of one or more output filters to filter said down-converted baseband signal.

13. The system of claim 12, further comprising a control signal generator that outputs a control signal, wherein said universal frequency translator operates according to said control signal.

14. The system of claim 13, wherein said control signal generator is a voltage controlled oscillator.

15. The system of claim 13, further comprising a decoder module comprised of one or more decoders, wherein said decoder module decodes said filtered down-converted signal to generate a decoded output signal.

16. The system of claim 15, further comprising a controller that operates under the direction of a user, said controller to issue at least a first command signal, a second command signal, a third command signal, a fourth command signal, and a fifth command signal, wherein said input filter module operates according to said first command signal, said universal frequency translator operates according to said second command signal, said control signal generator operates according to said third command signal, said output filter module operates according to said fourth command signal, and said decoder module operates according to said fifth command signal.

* * * * *